US010057062B2

(12) United States Patent
Nadathur et al.

(10) Patent No.: US 10,057,062 B2
(45) Date of Patent: *Aug. 21, 2018

(54) RELAY SERVICE FOR COMMUNICATION BETWEEN CONTROLLERS AND ACCESSORIES

(71) Applicant: Apple Inc., Cupertino, CA (US)

(72) Inventors: Anush G. Nadathur, San Jose, CA (US); Gokul P. Thirumalai, Mountain View, CA (US); Kevin P. McLaughlin, Waikoloa, HI (US); Matthew C. Lucas, San Jose, CA (US); Andrew Burks, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,707

(22) Filed: Jun. 9, 2017

(65) Prior Publication Data

US 2017/0346630 A1 Nov. 30, 2017

Related U.S. Application Data

(63) Continuation of application No. 15/064,406, filed on Mar. 8, 2016, now Pat. No. 9,680,646.
(Continued)

(51) Int. Cl.
*H04L 9/32* (2006.01)
*G03F 7/04* (2006.01)
(Continued)

(52) U.S. Cl.
CPC .............. *H04L 9/14* (2013.01); *H04L 9/006* (2013.01); *H04L 12/2818* (2013.01);
(Continued)

(58) Field of Classification Search
CPC ....... H04L 9/14; H04L 67/125; H04L 67/141; H04L 9/006; H04L 63/0884;
(Continued)

(56) References Cited

U.S. PATENT DOCUMENTS 9,680,646 B2 * 6/2017 Nadathur ................. H04L 9/14
2003/0182479 A1 * 9/2003 Massa ................... G06F 3/0601
710/36
(Continued)

FOREIGN PATENT DOCUMENTS

CN 101690125 A 3/2010
CN 102546584 A 7/2012
(Continued)

OTHER PUBLICATIONS

Office Action and Search Report dated Jan. 26, 2017 in Taiwanese Paten Application No. 105117768. 6 pages (with English translation).
(Continued)

*Primary Examiner* — Aravind K Moorthy
(74) *Attorney, Agent, or Firm* — Kilpatrick, Townsend and Stockton LLP

(57) ABSTRACT

A relay service can relay messages between controllers and electronically controllable accessory devices that may be located remotely from the controllers. Relaying of messages by the relay service can be decoupled from any knowledge of the functionality of the accessory or the content of the messages. Device identification and relaying of messages can be managed using "relay aliases" that are meaningful only to the relay service and the endpoint devices (the controller and accessory). The endpoint devices can implement end-to-end security for messages transported by the relay service.

20 Claims, 18 Drawing Sheets

Related U.S. Application Data

(60) Provisional application No. 62/171,995, filed on Jun. 5, 2015.

(51) Int. Cl.
| | | |
|---|---|---|
| *H04L 9/14* | (2006.01) | |
| *H04L 9/00* | (2006.01) | |
| *H04L 12/28* | (2006.01) | |
| *H04L 29/06* | (2006.01) | |
| *H04L 29/08* | (2006.01) | |
| *H04W 12/06* | (2009.01) | |
| *H04W 12/04* | (2009.01) | |

(52) U.S. Cl.
CPC ........ *H04L 63/0884* (2013.01); *H04L 67/125* (2013.01); *H04L 67/141* (2013.01); *H04W 12/06* (2013.01); *H04L 63/0823* (2013.01); *H04W 12/04* (2013.01)

(58) Field of Classification Search
CPC ........... H04L 12/2818; H04L 63/0823; H04W 12/06; H04W 12/04
USPC ..................... 713/175, 168; 726/6
See application file for complete search history.

(56) References Cited

U.S. PATENT DOCUMENTS

| | | |
|---|---|---|
| 2004/0192206 A1 | 9/2004 | Hirvonen |
| 2006/0143305 A1 | 6/2006 | Mason et al. |
| 2007/0217344 A1 | 9/2007 | Krywaniuk |
| 2008/0005227 A1 | 1/2008 | Subbian |
| 2008/0205391 A1 | 8/2008 | Suryaputra et al. |
| 2008/0320190 A1 | 12/2008 | Lydon et al. |
| 2012/0096503 A1 | 4/2012 | Slothouber et al. |
| 2013/0061316 A1 | 3/2013 | Iskin et al. |
| 2015/0052235 A1 | 2/2015 | Tokunaga |
| 2015/0215292 A1 | 7/2015 | Novicov |
| 2016/0127364 A1* | 5/2016 | Robison, Jr. ........ H04L 63/0869 726/4 |
| 2016/0234186 A1* | 8/2016 | Leblond ................. G06Q 10/06 |
| 2016/0246753 A1* | 8/2016 | Tan ..................... G06F 13/4282 |

FOREIGN PATENT DOCUMENTS

| | | |
|---|---|---|
| CN | 103635940 | 3/2014 |
| CN | 104508390 | 4/2015 |
| EP | 1133120 | 9/2001 |
| TW | 200515790 | 5/2005 |
| TW | 201502969 A | 1/2015 |

OTHER PUBLICATIONS

International Application No. PCT/US2016/035208, International Search Report and Written Opinion dated Aug. 11, 2016, 13 pages.

Apple White Paper iOS Security. Dated Feb. 2014. 33 pages.

Notice of Allowance and Fee(s) Due dated Feb. 1, 2017 in U.S. Appl. No. 15/064,406. 10 pages.

Notice of Decision to Grant dated Oct. 26, 2017 in Taiwanese Patent Application No. 105117768. 10 pages. (English translation of allowed claims provided).

CN201680031641.0, "Office Action", dated May 9, 2018, 9 pages.

* cited by examiner

RELAY SERVICE FOR COMMUNICATION BETWEEN CONTROLLERS AND ACCESSORIES

CROSS-REFERENCES TO RELATED APPLICATIONS

The present application is a continuation of U.S. patent application Ser. No. 15/064,406, filed Mar. 8, 2016, entitled, "RELAY SERVICE FOR COMMUNICATION BETWEEN CONTROLLERS AND ACCESSORIES," which claims priority to U.S. Provisional Application No. 62/171,995, filed Jun. 5, 2015, entitled "RELAY SERVICE FOR COMMUNICATION BETWEEN CONTROLLERS AND ACCESSORIES," the disclosures of which are hereby incorporated by reference in their entirety for all purposes.

The present disclosure is also related to the following U.S. Patent Applications: U.S. application Ser. No. 14/614,914, filed Feb. 5, 2015; U.S. application Ser. No. 14/725,891, filed May 29, 2015; and U.S. application Ser. No. 14/725,912, filed May 29, 2015. The disclosures of these applications are also incorporated by reference herein in their entirety for all purposes.

BACKGROUND

The present disclosure relates generally to remote control of accessory devices and in particular to a relay service that provides secure communication between controller devices and accessories via a public network.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc.

Many users want to be able to interact remotely with controllable devices. For example, some dream of being able to verify, without going back home to check, that the oven is off or the front door is locked. To meet this desire, some manufacturers have begun to offer "Internet-enabled" appliances that have the ability to connect to a user's wireless local area network (e.g., a Wi-Fi network) and thereby become accessible via the Internet. This convenience, however, is not without problems. For example, instances have been reported of Internet-enabled baby monitors being hacked by pranksters who find amusement in disturbing sleeping infants. Such stories may make users reluctant to introduce Internet-enabled appliances into their homes.

SUMMARY

Certain embodiments of the present invention relate to a relay service that can provide users with remote access to electronically controllable devices (e.g., in-home devices such as a thermostat, lighting systems, home security systems, and so on). The relay service can be used to exchange messages between a "controller device" and various other electronically controllable devices (referred to herein as "accessory devices" or simply "accessories"). A controller can be implemented, for example, on a general-purpose computing device such as a desktop computer, laptop computer, tablet computer, smart phone, other mobile phone, other handheld device, or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, kitchen appliances, and so on. The relay service can use a public, unsecured communication medium (e.g., the Internet) to receive messages from a controller device and relay them to an accessory and vice versa.

In various embodiments, the relay service can implement features that may help to protect user privacy. For example, the relaying of messages between a controller and accessory can be decoupled from any knowledge of the functionality of the accessory or the content of the messages. Further, the identification of devices can be managed using "relay aliases" that are meaningful only to the relay service and the endpoint devices (the controller and accessory). In some embodiments, the relay service can operate while remaining agnostic as to the identity (e.g., manufacturer, model, etc.), functionality, or current state of any accessories. Thus, even if communications between the relay service and endpoints (or even within the relay service) are intercepted, it may not be possible to extract information about the nature or state of any accessories or to determine how to communicate with any accessory.

In addition, in some embodiments, the relay service can be used as a transport by controllers and accessories to transport messages that are formatted according to a protocol (e.g., a uniform accessory protocol as described below) that provides end-to-end communication security. In some instances, the uniform accessory protocol may first require a "local" setup process to be performed while the accessory and controller are in "local communication" with each other (i.e., communicating without the aid of the relay service, e.g., via a wireless local area network or personal area network), and the relay service may only become usable to communicate with a particular accessory after this local setup is performed. Such measures can further enhance security of the relay service while providing users the convenience of being able to access their accessory devices (e.g., home-based devices) from anywhere in the world.

In some embodiments, the relay service can include a reporting service that is able to anonymously gather data relating to anomalous accessory messaging behavior detected by the relay service. This can allow for identification and remediation of certain types of accessory malfunctions or faults (e.g., faulty firmware) without recording data that would indicate which users own or use what accessories. Remediation in some instances can include temporarily (or permanently) precluding certain accessories from connecting to the relay service.

The following detailed description together with the accompanying drawings will provide a better understanding of the nature and advantages of the present invention.

DETAILED DESCRIPTION

Example Environment

Figure 1:
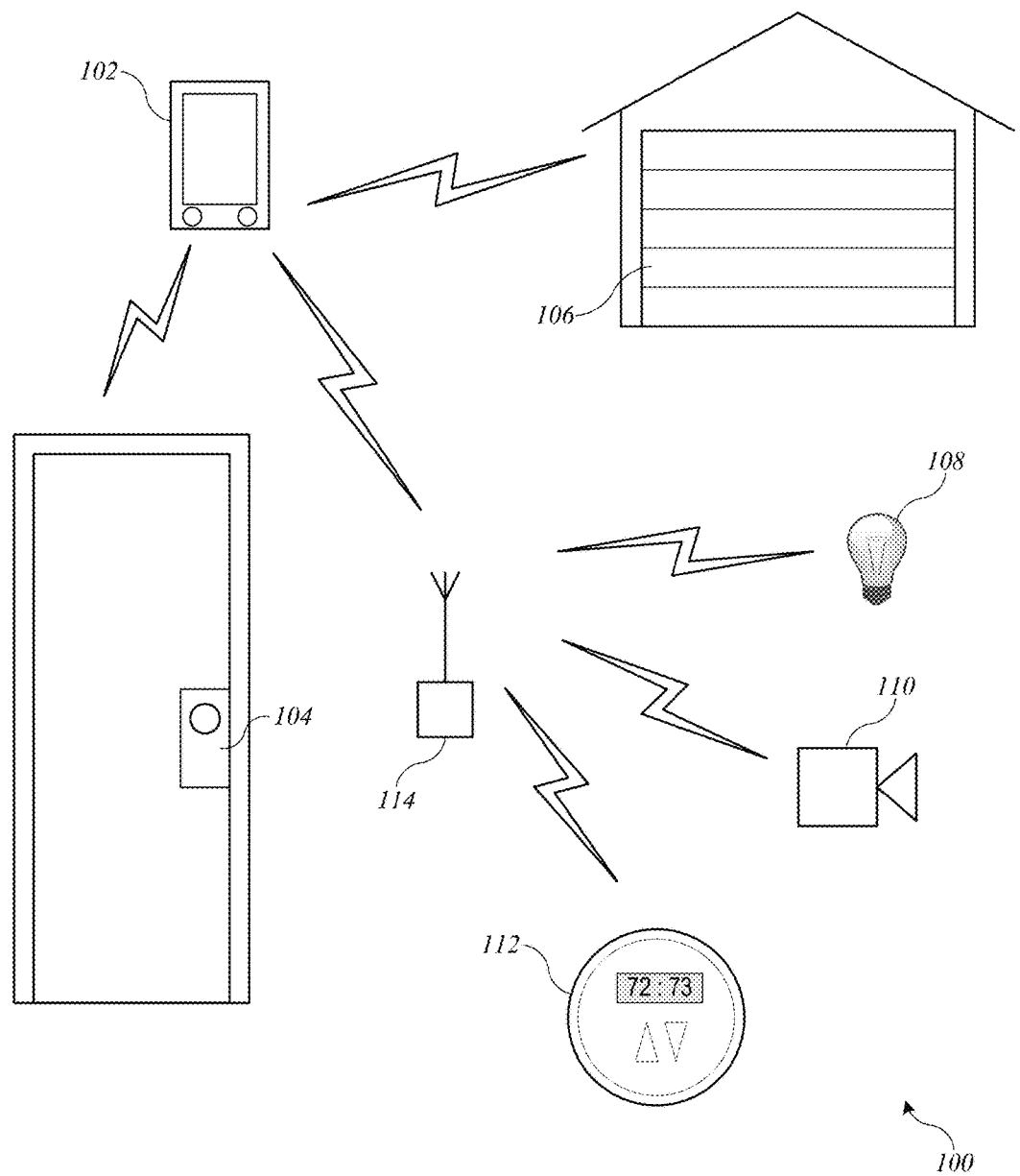
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described in above-referenced U.S. application Ser. No. 14/725,891.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). In some embodiments, an intermediary can function as a proxy or coordinator as described in above-referenced U.S. application Ser. No. 14/725,891.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that can facilitate communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. Other combinations of wired and wireless communication are also possible.

Further, while one controller 102 is shown, a home (or other) environment can have multiple associated controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileged can be configured and controlled, for example, using techniques described in above-referenced U.S. application Ser. No. 14/725,891 and U.S. application Ser. No. 14/725,912.

In some embodiments, a uniform accessory protocol can facilitate communication by a controller 102 with one or more accessories 104-112. The uniform accessory protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. An accessory can provide an "attribute database" that identifies the services and characteristics that the accessory exposes to controllers. A controller can read the attribute database (or a portion thereof) from an accessory and use the attribute database to determine how to interact with the accessory. Examples of an accessory model based on services and characteristics are described in above-referenced U.S. application Ser. No. 14/614,914.

The uniform accessory protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics (e.g., by sending a read request) and in some instances to modify the characteristics (e.g., sending a request to write to the power characteristic can result in turning an accessory off or on). Accordingly, any type of accessory, regardless of function or manufacturer, can be controlled by sending appropriate messages. The message format can be the same across accessories of disparate types. Examples of message formats are described in above-referenced U.S. application Ser. No. 14/614,914.

The uniform accessory protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to controllers that have received authorization. For instance, the uniform accessory protocol can specify one or more mechanisms (including mechanisms referred to herein as "pair setup" and "pair add") for establishing a "pairing" (also referred to herein as a "local pairing") between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a local pairing is established, controller 102 is considered authorized, and thereafter, controller 102 and accessory 104 can go in and out of communication as desired without losing the established pairing. When controller 102 attempts to communicate with or control accessory 104, a "pair verify" process specified by the uniform accessory protocol can first be performed to verify that an established local pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a local pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914. In some embodiments of the present invention, additional "relay pairing" processes can be defined and used to allow controllers to communicate with accessories via a relay service external to the local environment. Examples are described below.

In some embodiments, a controller can establish a pairing with multiple accessories and can define an "environment model" representing the accessories in relation to each other. The model can be as simple as a list of accessories in the environment (e.g., all accessories present in a user's home). Other implementations can allow the user to define groupings of accessories based on location (e.g., accessories in a specific room within the home, or accessories in a "zone," which can be defined as a grouping of rooms such as all bedrooms or all upstairs rooms), by usage (e.g., a "service group" of accessories the user wants to use together or an "action set" that can automatically trigger certain accessory operations in response to detected events or conditions), and so on. The environment model can also represent various controllers and/or users that are authorized (or have "permission") to access various accessories. Where multiple controllers share access to the same environment, the environment model can be shared among the controllers using synchronization operations. Examples of environment models and synchronization operations are described in above-referenced U.S. application Ser. No. 14/725,912.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

In some embodiments, one or more controllers can establish a level of privilege (referred to herein as an "administrator" or "admin" privilege) with an accessory that permits controllers with the admin privilege to determine whether other controllers should be granted permission to communicate command-and-control messages to the accessory. For example, an accessory can restrict the pair setup operation described above to situations in which it does not have an established pairing with any controller; the first controller to perform (local) pair setup is granted admin privilege automatically. Thereafter, the accessory can refuse to permit additional pairings to be established, except by a controller that has admin privilege (such controllers also have an established pairing). The admin controller can add other controllers as authorized to use the accessory, e.g., using a pair add process. For instance, separately from any communication with the accessory, the admin controller can obtain a long term public key for a second controller. The admin controller can establish a verified session (also referred to as a "pair-verified session") with the accessory using the long term public keys exchanged during pair setup. The verified session can have a session key, and all communication within the verified session can be encrypted using the session key. Within the verified session, the admin controller can perform a pair add operation with the accessory to establish a pairing between the accessory and the second controller. The pair add operation can include providing the long term public key for the second controller to the accessory and receiving in exchange a second long term public key for the accessory (which might or might not be the same key received when the first controller established its pairing). The admin controller can communicate the second long term public key for the accessory to the second controller. This process can establish a local pairing between the second controller and the accessory; thereafter, the second controller can establish its own verified session to send command-and-control messages to the accessory. The first controller can repeat the pair add process to establish local pairings between the accessory and any number of controllers. As described below, a separate processor can be used by an admin controller to establish a relay pairing on behalf of another controller.

In some instances, the first controller to pair can instruct the accessory to grant an administrator (or "admin") privilege to the second controller, e.g., during the pair add process. Granting the admin privilege can allow the second controller to perform pair add operations to add additional controllers if desired, and depending on implementation, the second controller might or might not be able to grant admin privilege to the additional controllers. The admin privilege can be automatically assigned to the first controller that establishes a pairing with a brand-new accessory (or with an accessory that has no established pairings). The use of an admin privilege can help device owners to regulate which controllers can obtain access to a particular accessory.

Figure 2:
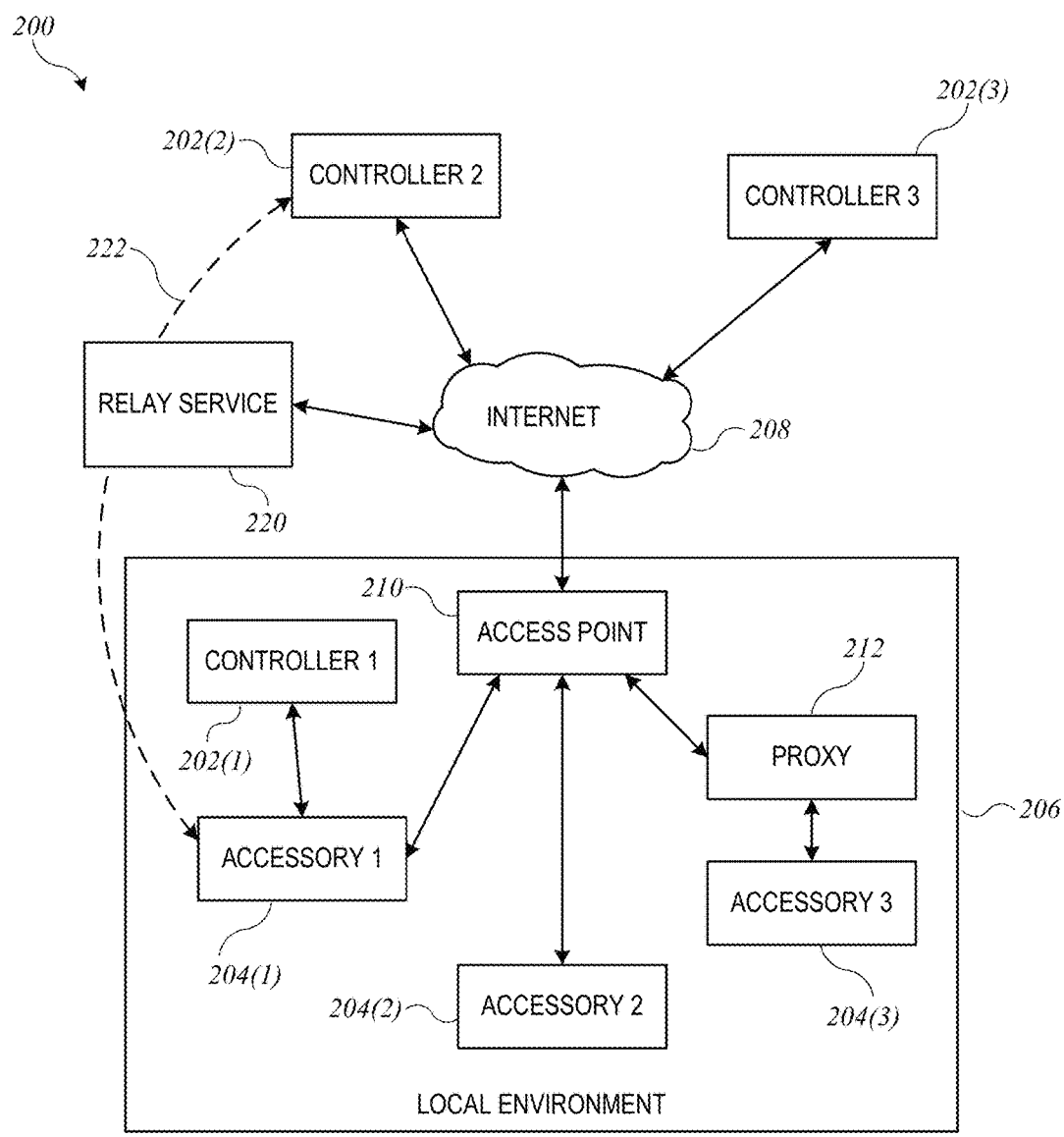
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment such as environment 100 described above). Each controller 202 can be an electronic device owned and/or operated by a user who frequents environment 206 (e.g., a resident of a home or a regular visitor to the home). Controllers 202 can each be similar to controller 102 of FIG. 1, and accessories 204 can be similar to various accessories shown in FIG. 1.

Accessories 204 can each communicate with an access point 210 that can be located in local environment 206. Access point 210 can provide a local area network (LAN) to which accessories 204 and controllers 202 (when present in local environment 206) can connect. Any type of LAN technology can be used, including Wi-Fi networks or other wireless LAN technologies. Thus, access point 210 can facilitate communication between accessories 204 and controllers 202 within local environment 206. In some embodiments, a controller (e.g., controller 202(1)) that is present in local environment 206 can communicate directly with an accessory (e.g., accessory 204(1)). Bluetooth communication, ad hoc wireless networking, or other point-to-point communication technologies can be used as desired.

In some instances, an accessory might not communicate directly with access point 210 or with controllers 202. For example, accessory 204(3) can be connected to a proxy 212, and controllers 202 and/or access point 210 can communicate with accessory 204(3) via proxy 212. In various embodiments, proxy 212 can provide relaying of messages to and from accessory 204(3). Proxy 212 can implement communication security measures and/or protocol translation, and a single proxy 212 can interface to one or more accessories 204. In some embodiments, proxy 212 can be an "intelligent" device that can coordinate operations among multiple controllers and/or accessories and is not limited to passively relaying messages. Specific examples of proxy devices that can be implemented as proxy 212 (including devices referred to variously as bridges, tunnels, and coordinators) are described in above-referenced U.S. application Ser. No. 14/725,891.

In some embodiments, accessories 204 and controllers 202 that are present in local environment 206 can communicate using a local area network (LAN), such as a Wi-Fi network and/or a point-to-point communication medium such as Bluetooth LE. It is to be understood that other communication transports and protocols can be used. In some embodiments, controllers 202 and accessories 204 (and proxy 212 if present) can support a uniform accessory protocol as described above that can be implemented using both Wi-Fi and Bluetooth LE as transports.

In the example of FIG. 2, controller 202(1) is currently located in local environment 206 with accessories 204 and coordinator 210. For example, controller 202(1) can be on the same LAN as accessories 204. Controllers 202(2) and 202(3) are currently located outside local environment 206 but are connected to a communication network 208 (e.g., the Internet); such controllers are said to be "remote" from accessories 204. It is to be understood that controllers 202 can be mobile devices that are sometimes within local environment 206 and sometimes outside local environment 206. Accessories 204 need not be mobile and need not be connected to communication network 208. In some embodiments, access point 210 can be connected to communication network 208 (e.g., access point 210 can be implemented as a conventional Wi-Fi access point or base station) and can permit remote access to accessories 204 by remote controllers 202(2) and 202(3).

However, it may not be desirable to configure each of accessories 204 as a wide-area network device that can be found and communicated with by any device able to connect to communication network 208. For instance, if communication network 208 is the Internet, a vast number of devices, including devices owned by anyone anywhere in the world, may be able to locate accessories 204 and attempt operations for which they are not authorized. Thus, to more selectively allow controllers 202 to communicate with accessories 204 via network 208, it may be useful to employ a relay service 220.

According to various embodiments of the present invention, relay service 220 can facilitate communication between controllers 202 (in particular remote controllers 202(2), 202(3)) and accessories 204 via communication network 208. For example, relay service 220 can establish a persistent connection to accessory 204(1), in which accessory 204(1) is identified by a persistent accessory alias (also referred to as an "accessory relay alias," or "accessory RA") that is assigned by relay service 220 and known to controllers 202 (but presumably not to other devices that are not authorized to access accessories 204). Controller 202(2) can send a request to relay service 220 to deliver a message to accessory 204(1); the request can include the message content, the accessory alias assigned to accessory 204(1) by relay service 220, and additional information (e.g., an access token as described below) usable by relay service 220 to verify that controller 202(2) is authorized to communicate with accessory 204(1). Relay service 220 can deliver the message to accessory 204(1). Response messages from accessory 204(1) can be delivered to controller 202(2) in a similar manner, using a persistent operator alias (also referred to as an "operator relay alias," or "operator RA") that is assigned to controller 202(2) by relay service 220 and known to accessory 204(1) but presumably not to devices that are not authorized to use relay service 220 to communicate with controller 202(2). The message content exchanged between controller 202(2) and accessory 204(1) via relay service 220 can conform to a uniform accessory protocol as described above, and message content can be opaque to relay service 220. Accordingly, controller 202(2) and accessory 204(1) can communicate via relay service 220 to establish a pair-verified session (as defined above) and can encrypt message content such that the message content is not readable by relay service 220 or any other intermediary through which the message content may pass. In this manner, relay service 220 can provide a secure end-to-end communication path (indicated by dashed line 222) between controller 202(2) and accessory 204(1) (or between any controller 202 and any accessory 204).

In some embodiments, controllers 202 can be configured to communicate with accessories 204 without using relay server 220 when possible. For example, when controller 202(2) determines that it should send a message to accessory 204(1) (e.g., based on user input or a received notification as described below), a communication daemon or other process executing in controller 202(2) can determine whether "local access" (or a "local channel") to accessory 204(1) is currently available. For instance, controller 202(2) can actively or passively scan for the presence of accessory 204(1) on a local network or point-to-point communication technology; if accessory 204(1) is detected, then local access is possible. If accessory 204(1) is not detected, then local access is not available and controller 202(2) can communicate with relay service 220 instead. The determination whether to use local access or relay service 220 can be transparent to the user and can be made each time a communication channel to the accessory is to be established. Thus, a user who wants to interact with accessory 204(1) using controller 202(2) can simply do so without worrying about whether to use local access or remote access via relay service 220.

It will be appreciated that network configuration 200 is illustrative and that variations and modifications are possible. Any number of controllers and any number of accessories can be included in a network configuration. In some embodiments, the network configuration can include one or more proxies (e.g., bridges, tunnels, coordinators as described in above-referenced U.S. application Ser. No. 14/725,912). Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

Example Relay Service

Figure 3:
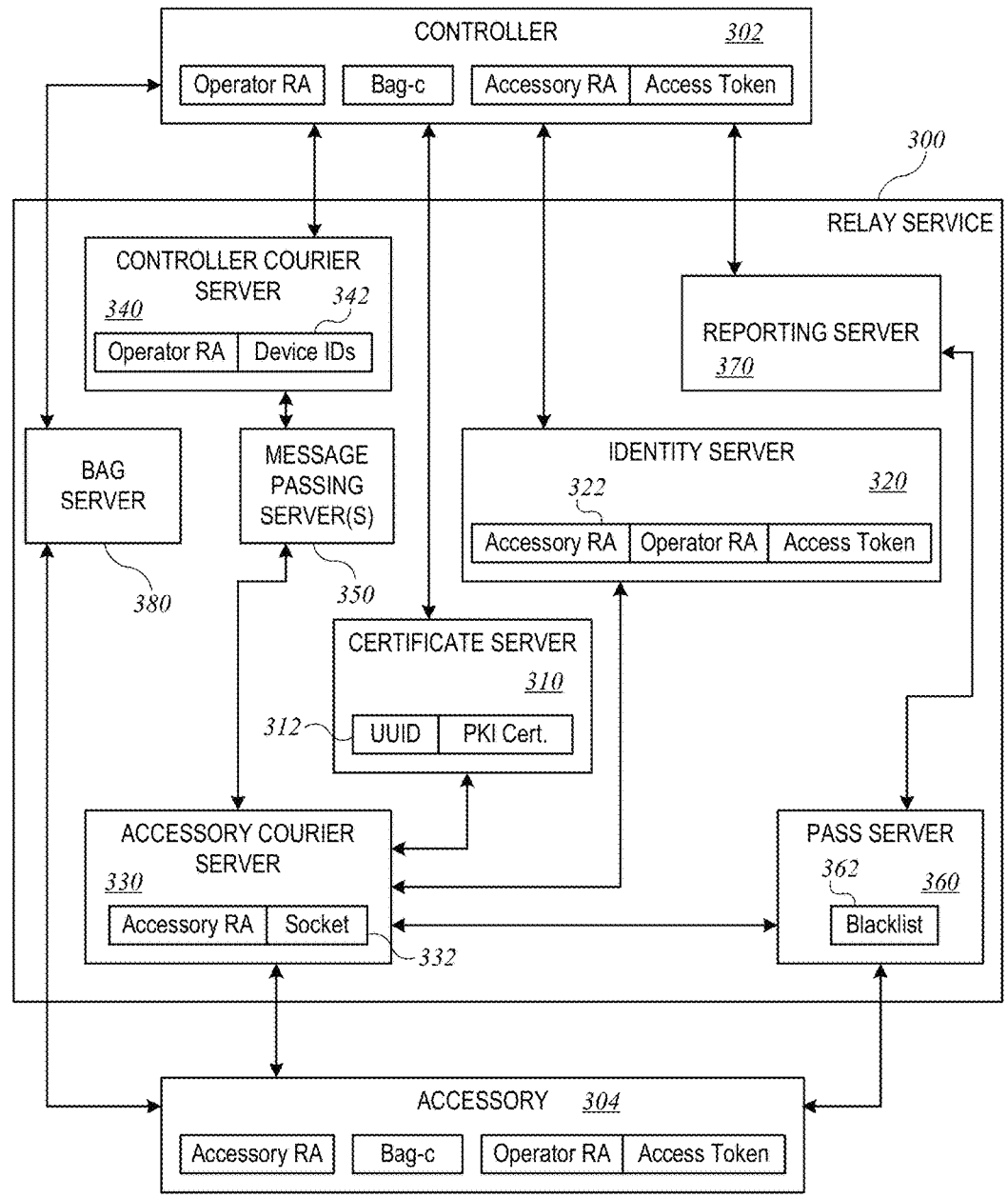
FIG. 3 shows a simplified block diagram of a relay service according to an embodiment of the present invention.

FIG. 3 shows a simplified block diagram of a relay service 300 according to an embodiment of the present invention. Relay service 300 can be an implementation of relay service 220 of FIG. 2 and can relay messages between a controller 302 (e.g., any of controllers 202 of FIG. 2) and an accessory 304 (e.g., any of accessories 204 of FIG. 2).

Relay service 300 can include a certificate server 310, an identity server 320, an accessory courier server 330, a controller courier server 340, a message passing server 350, a pass server 360, a reporting server 370, and a bag server 380. Each server can be implemented as a single server or server farm using conventional server hardware (e.g., interconnected blade servers), and the same or different server hardware can be used to implement different servers.

Certificate server 310 can be used to generate identity tokens and public key infrastructure (PKI) certificates for endpoint devices (including accessory 304 and/or controller 302) that use relay service 300. In operation, certificate server 310 can implement a certificate authority capable of generating PKI certificates upon request (e.g., using standard certificate-generating algorithms) and validating PKI certificates upon request. Certificate server 310 can also generate a device identity token for an endpoint device and associate the device identity token with the PKI certificate. The device identity token can be, for example, a randomly generated universally unique identifier (UUID). In some embodiments, the device identity token is generated according to a scheme that ensures that the device identity token provides no information as to the nature, capabilities, and/or physical location of the device to which it is assigned. Once a device identity token and a PKI certificate have been assigned to an endpoint device, the endpoint device is said to be "activated." An activated device can subsequently authenticate itself to relay service 300 by presenting its device identity token and PKI certificate. Certificate server 310 can store a certificate repository 312 including valid UUIDs and associated PKI certificates and can use certificate repository 312 to facilitate authentication of an endpoint device. Examples of operation of certificate server 310 are described below.

Identity server 320 can be used to generate "access" tokens that allow specific controllers to communicate with specific accessories. As described below, when a controller (e.g., controller 302) and an accessory (e.g., accessory 304) mutually request to be paired within the context of relay service 300 (referred to as establishing a "relay pairing," which can be distinct from a local pairing), identity server 320 can generate a unique access token that is associated with an "operator relay alias" (also referred to as an "operator alias" or "operator RA") of controller 302 and with an "accessory relay alias" (also referred to as an "accessory alias" or "accessory RA") of accessory 304. The operator RA and accessory RA can be aliases arbitrarily assigned by relay service 300; examples are described below. Access tokens generated by identity server 320 can be securely delivered to the particular accessory 304 and controller 302 that requested a relay pairing. Thereafter, when controller 302 sends a relay request to relay service 300 to relay a message to accessory 304 (or vice versa), controller 302 (or accessory 304) can provide the corresponding access token to relay service 300 together with the message content, the operator RA, and the accessory RA. Identity server 320 can maintain a token repository 322 that associates a combination of accessory RA and operator RA with an access token, thus allowing identity server 320 to validate the access token. Relay service 300 can decline to relay a message if a valid access token is not provided. Examples of operation of identity server 320 are described below.

Accessory courier server 330 can maintain a persistent connection (e.g., a socket) to endpoint accessory devices (e.g., accessory 304) that have been registered with relay service 300 (e.g., via certificate server 310 as described below). Through this connection, accessory courier server 330 can deliver messages received from a controller (e.g., controller 302) by relay service 300 to accessory 304 and can receive relay requests from accessory 304 that include messages to be delivered to controller 302 (or to another controller, as specified by accessory 304). For instance, accessory courier service 330 can maintain a mapping 332 of accessory RAs to active sockets and can deliver messages to accessory 304 or pass messages received from accessory 304 based on the accessory RA included with the message. Examples of operation of accessory courier server 330 are described below. As will become apparent, accessory courier server 330 can be agnostic as to what type (e.g., manufacturer and/or functionality) of accessory 304 is communicating, where accessory 304 is physically located, what controller 302 (or user) is communicating with accessory 304, or what information is being communicated between accessory 304 and controller 302.

Controller courier server 340 can establish persistent connections to endpoint controller devices (e.g., controller 302) that have been registered with relay service 300. In some embodiments, controller courier server 340 can leverage an existing infrastructure for communicating messages between mobile devices of different users and/or pushing notifications to a user's mobile device(s), such as the infrastructure supporting the iMessage® service and/or push notification services for mobile devices provided by Apple Inc., assignee of the present application. In some embodiments, controller courier server 340 can maintain a mapping 342 of operator RAs associated with a particular user to device IDs that can be associated with specific controller devices owned or operated by the user. Examples of operation of controller courier server 340 are described below. As will become apparent, controller courier server 340 can be agnostic as to the identity or functionality of accessory 304 with which controller 302 is communicating or what information is being communicated between controller 302 and accessory 304.

Message passing server 350 can be implemented using various gateways and the like and can operate to direct messages between accessory courier server 330 and controller courier server 340. For example, message passing server 350 can direct messages received from controller 302 via controller courier server 340 to accessory courier server 330 for delivery to accessory 304; passing of messages in the reverse direction can also be supported. In some embodiments, message passing server 350 can also facilitate passing of messages between any servers included in relay service 300, e.g., between accessory courier server 330 and certificate server 310, and so on. Examples of operation of message passing server 350 are described below.

Pass server 360 can be used to support a "pass" service that allows relay service 300 to block access by anomalous or suspect accessories. For example, in order to establish a connection with accessory courier server 330, accessory 304 (or any accessory) may be required to present a pass obtained from pass server 360. In some embodiments, accessory 304 can request a pass by providing accessory-identifying information (e.g., manufacturer and model information) to pass server 360. Pass server 360 can determine whether the accessory-identifying information is included in a current "blacklist" 362 of anomalous accessories that have been temporarily or permanently blocked from using relay service 300; examples of creating and updating blacklist 362 are described below. If accessory 304 is not included in blacklist 362, pass server 360 can generate a pass for accessory 304. The pass can include a timestamp (e.g., with five or ten minute granularity or the like) and a code usable by accessory courier server 306 to verify that the pass was issued by pass server 360. The pass need not include any information specific to accessory 304, and pass server 360 can generate identical passes in response to multiple requests from different accessories. The accessory can present the pass to accessory courier server 330. In this example, pass server 360 can receive identifying information about the accessory (e.g., manufacturer and model information may indicate what type of accessory it is) but does not need to retain the identifying information or associate it with the accessory RA used elsewhere within relay service 300, and the pass generated by pass server 360 need not contain any accessory-identifying information. In some embodiments, pass server 360 can communicate to accessory courier server 330, e.g., to provide a currently valid timestamp. Examples of operation of pass server 360 are described below.

Reporting server 370 can manage a reporting and diagnostic process that allows for privacy-protected collection of information about accessories that may be behaving anomalously (e.g., generating excessive traffic on relay service 300). For example, as described below, while investigating anomalous activity, reporting server 370 can receive reports from controller devices that provide accessory-identifying information associated with an investigation identifier (or "investigation ID") assigned by an operator of relay service 300. The reports can be anonymous in that the particular operator RA and/or accessory RA are not provided. Based on the received reports, reporting server 370 can identify accessory types correlated with anomalous behavior (e.g., a garage door opener made by a particular manufacturer) and can initiate follow-up action, such as alerting the manufacturer to the anomalous behavior and/or adding the anomalous accessory type to blacklist 362 until the underlying issue can be resolved. Examples of operation of reporting server 370 are described below.

Bag server 380 can be used to provide accessory 304 and controller 302 with addressing information usable to enable communication with various servers of relay service 300, including, e.g., controller courier server 340 and/or accessory courier server 330. The addressing information can include, e.g., a uniform resource locator ("URL") or information usable to construct a URL for various servers of relay service 300. For example, a URL can be constructed using a base host name and a host instance identifier, either or both of which can be provided by bag server 380. The addressing information can be provided in the form of a "bag" (e.g., a data structure containing various fields of addressing information for one or more servers of relay service 300) by bag server 380 in response to a request, e.g., from controller 302 (which can receive "Bag-c" as shown in FIG. 3) or accessory 304 (which can receive "Bag-a" as shown in FIG. 3). In some embodiments, controller 302 or accessory 304 can cache a received bag and continue using the bag information across multiple connections to the server. In some embodiments, the bag can include expiration information (e.g., time to live), and after the expiration of the bag, a controller or accessory can retrieve a new bag from bag server 380. The new bag may contain the same information or different information. While bag server 380 and the use of bags to provide addressing information are not required, use of a bag or similar mechanism to provide addressing information for various servers of relay service 300 can allow the operator of relay service 300 to dynamically reallocate resources (e.g., for load balancing among multiple instances of accessory courier server 330 or controller courier server 340 and/or for security purposes).

In operation, the various servers of relay service 300 can communicate with each other and with controllers and accessories using a transport protocol that provides transport layer security. For example, communication can be enabled using HTTPS/IP (hypertext transport protocol with Secure Socket Layer (SSL) implemented on an Internet Protocol stack, a well-known transport protocol) or HTTP2 with Transport Layer Security (TLS). Any or all messages exchanged between servers of relay service 300 can be digitally signed by the sending server and validated by the receiving server. Messages exchanged between accessory 304 and controller 302 via relay service 300 can have additional security at the message level. For example, as described above, an accessory and controller can communicate using a uniform accessory protocol that provides security through a pair-verified session that has an associated session key. Via relay service 300, controller 302 and accessory 304 can establish a pair-verified session according to the uniform accessory protocol, thereby establishing a session key known only to controller 302 and accessory 304. The content of messages within the pair-verified session can be encrypted with the session key, thereby rendering message content opaque to relay service 300 (and any other intermediary through which the message content may pass, such as various Internet gateways, routers, and so on). This can provide a reliable level of privacy protection for users.

Communication between accessory 304 and accessory courier server 330 can use a different protocol from communication between controller 302 and controller courier server 340. For example, accessory 304 can send communications to accessory courier server 330 as HTTP requests (e.g., POST or GET requests to appropriate URLs defined at accessory courier server 340) and can receive communications as HTTP responses. At the same time, controller courier server 340 can use a messaging protocol (e.g., similar to SMTP or other email protocols) with header fields identifying the message sender and intended recipient, and a message body containing content to be delivered to the intended recipient. In some embodiments, message passing server 350 can convert communications between accessory courier server 330 and controller courier server 340 into appropriate formats.

It should also be noted that relay service 300 can be implemented to limit the distribution or accessibility of device-identifying information. For example, as described below, relay service 300 need not retain any information identifying accessory type or capabilities of accessory 304; instead, relay service 300 can simply retain enough information to verify that accessory 304 is an authorized endpoint device. The burden can be placed on accessory 304 to maintain a connection to relay service 300, and apart from the specific connection, relay service 300 does not need to know how to deliver communications to accessory 304. Operator relay aliases and accessory relay aliases used by relay service 300 can be assigned using random processes or other processes such that the aliases are not usable by third parties to associate messages exchanged through relay service 300 with a specific real-world controller or accessory. Even within relay service 300, it might not be possible to make such associations reliably. Thus, user privacy can be respected while still providing the convenience of being able to communicate with an accessory from anywhere in the world.

It will be appreciated that relay service 300 is illustrative and that variations and modifications are possible. Any number and combination of servers can be used to implement the various operations described herein as being performed by relay service 300 or components thereof. In some embodiments, operations described as being performed by different servers can be implemented using different software modules executing on the same server hardware. Further, not all servers and operations described herein are required; for instance, pass server 360, reporting server 370, and/or bag server 380 can be omitted. User privacy can be protected by limiting the information available to the various servers, while still retaining the ability of the servers to deliver communication between authorized devices and to recognize and block unauthorized communications.

Relay Setup Example

In some embodiments, relay service 300 can be used to relay messages between controller 302 and accessory 304 only after controller 302 and accessory 304 are established as endpoint devices that are authorized to communicate with each other. This process can be referred to as setting up a relay pairing and can include multiple stages. In a first stage, accessory 304 can be "activated" (e.g., obtaining authorization credentials that will allow accessory 304 to access relay service 300). In a second stage, accessory 304 and controller 302 can obtain and exchange aliases (also referred to as "relay aliases") assigned by relay service 300 for use in relaying messages between them. In a third stage, accessory 304 and controller 302 can establish a "relay pairing." This can be different from establishing a local pairing according to the uniform accessory protocol (e.g., using local pair setup and pair add processes described above). Examples of relay setup processes will now be described.

Figure 4:
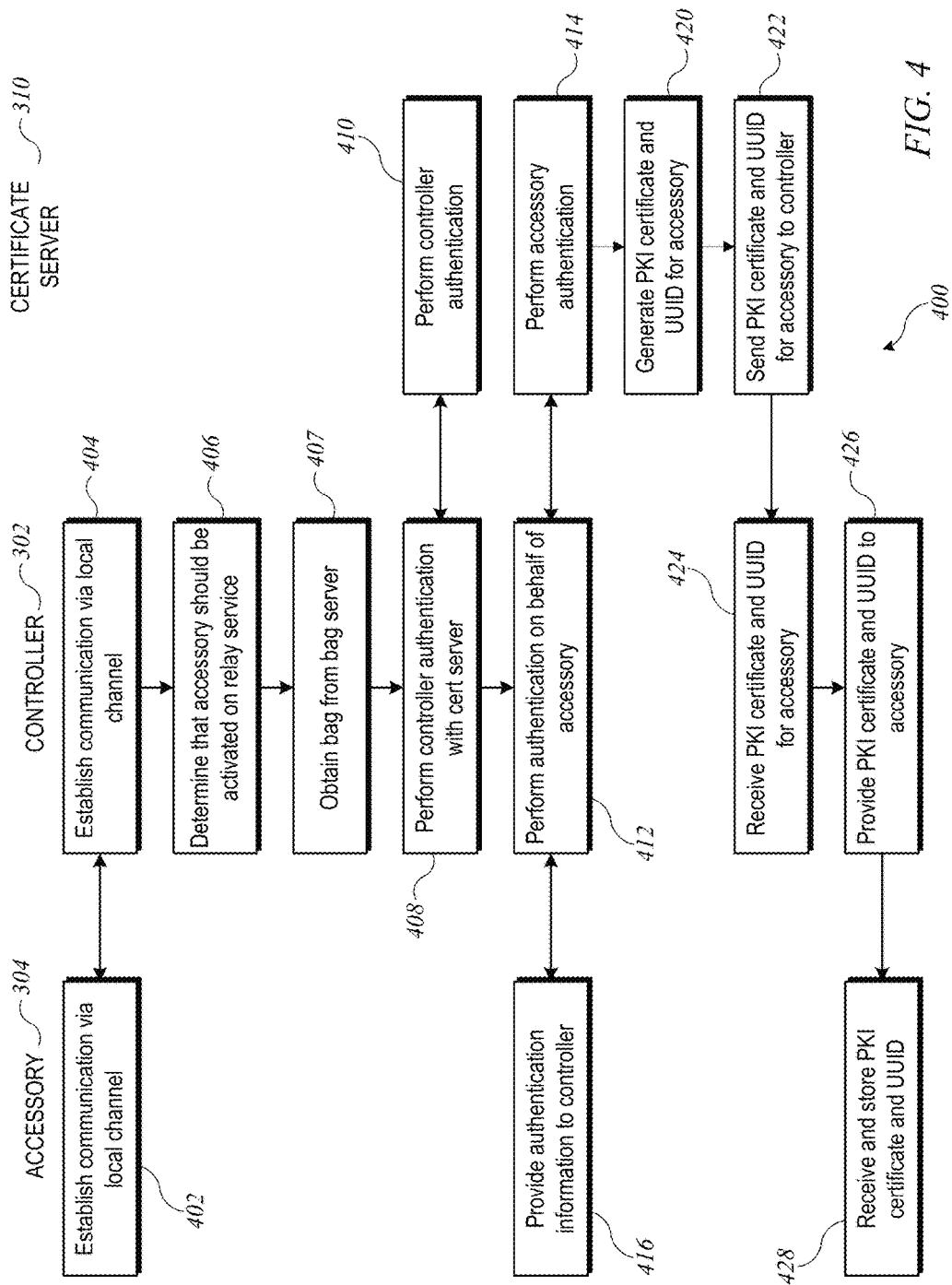
FIG. 4 shows a simplified flow diagram of an accessory activation process according to an embodiment of the present invention.

FIG. 4 shows a simplified flow diagram of an accessory activation process 400 according to an embodiment of the present invention. Process 400 can be implemented, e.g., using relay service 300 of FIG. 3. In this example, it is assumed that process 400 is performed at a time when controller 302 has local access to accessory 304 (e.g., as described above with reference to FIG. 2). It is also assumed that controller 302 has already established a local pairing with regard to accessory 304 according to a uniform accessory protocol as described above. (In some embodiments, local pairing is not required, but requiring local pairing as a precondition of accessory activation may provide useful security features for accessories.)

At blocks 402 and 404, accessory 304 and controller 302 can establish communication via a local channel. Communication can be established according to the uniform accessory protocol as described above. For example, establishing communication at blocks 402 and 404 can include establishing a pair-verified session between accessory 304 and controller 302.

At block 406, controller 302 can determine that accessory 304 should be activated on the relay service. For example, as noted above, accessory 304 can present to controller 302 an accessory model including a collection of services. In some embodiments, one of these services can be a "remote relay access" service. The presence of the remote relay access service in the accessory model can indicate to controller 302 that the accessory supports remote access via relay service 300. (It is not required that all accessories in a given environment support remote access via relay service 300 or any other form of remote access.) The remote relay access service can include various characteristics, one of which can have a Boolean value indicating whether the accessory has been activated, and block 406 can include reading this characteristic. In some embodiments, the determination at block 406 can also be based on user input. For instance, after establishing a pairing with accessory 304, controller 302 can present a prompt to the user to indicate whether accessory 304 should be configured for remote access via relay service 300; depending on the user's response, controller 302 can either continue or terminate process 400. Other decision criteria may also be used.

At block 407, controller 302 can obtain a controller bag from bag server 380. In some embodiments, the controller bag can include addressing information for some or all of the servers of relay service 300. For example, the controller bag can include addressing information for any or all of certificate server 310, identity server 320, controller courier server 340, and reporting server 370. In some embodiments, the controller bag can also include a URL to be used by accessory 304 to obtain its own bag from bag server 380. In some embodiments, controller 302 can obtain a controller bag during an initial configuration process or the first time it determines that an accessory should be activated on relay service 300; thereafter controller 302 can determine whether and when to obtain a new controller bag based on the expiration information in the previously obtained controller bag.

At blocks 408 and 410, controller 302 can authenticate itself to certificate server 310. It is assumed that controller 302 has already established an identity with certificate server 310; for instance, as part of the initial configuration of controller 302, controller 302 may have obtained a PKI certificate and device identity token (e.g., a UUID as described above) for itself from certificate server 310 (or from another source). In some embodiments, controller 302 can be provisioned with a PKI certificate and/or device identity token during manufacture. In some embodiments, controller 302 can obtain an initial controller bag from bag server 380 prior to establishing an identity with certificate server 310, and controller 302 can determine a URL for certificate server 310 based on addressing information in the controller bag. Certificate server 310 can perform standard certificate-validation techniques, such as receiving and validating a PKI certificate from controller 302, then obtaining a signed digital challenge from controller 302 and using the validated PKI certificate to verify the signature. Other authentication techniques can also be used. In some embodiments, authentication at blocks 408, 410 can be bidirectional; that is, controller 302 can also authenticate certificate server 310 before proceeding.

Having authenticated controller 302, at blocks 412, 414, and 416, controller 302 can perform a second authentication operation with certificate server 310 on behalf of accessory 304. For example, accessory 304 can be provisioned during manufacture with a digital security certificate (which can be issued, e.g., through a licensing program offered by a provider of relay service 300, such as the Made for iPhone (MFi) licensing program offered by Apple Inc.). Blocks 412, 414, and 416 can include controller 302 retrieving the digital security certificate from accessory 304 (via the local channel), forwarding the digital security certificate to certificate server 310 for validation, receiving a digital challenge from certificate server 310, forwarding the digital challenge to accessory 304 (via the local channel) for signature, receiving a response from accessory 304 (via the local channel), and forwarding the response to certificate server 310. In some embodiments, the communication between accessory 304 and controller 302 can be performed by reading from and/or writing to characteristics of the accessory's remote relay access service (or another accessory service depending on implementation). Certificate server 310 can validate the digital security certificate (e.g., by communicating with the certificate authority that issued it or by using an established trust chain) and use the validated certificate to verify the signed digital challenge produced by accessory 304.

Assuming authentication of accessory 304 succeeds, at block 420, certificate server 310 can generate a new PKI certificate and an associated device identity token (e.g., UUID) for accessory 304. The new PKI certificate and/or device identity token can be generated using random or pseudorandom processes or the like, such that the PKI certificate and/or device identity token are not usable to reconstruct any accessory-identifying information (e.g., manufacturer, accessory type, accessory functionality, or accessory location) that may have been included (explicitly or implicitly) in the original digital security certificate with which accessory 304 is provisioned during manufacture. For example, the digital security certificate used to authenticate the accessory at blocks 412, 414, 416 may be usable to determine a manufacture, accessory type, or other information about what accessory 304 is and/or what it can do. The PKI certificate and device identity token (e.g., UUID) issued by certificate server 310 need not have any correlation with any accessory attribute. In some embodiments, certificate server 310 can persistently store the PKI certificate and UUID (or other device identity token) without also retaining the accessory's digital security certificate or any information obtained therefrom. In some embodiments, the PKI certificate generated by certificate server 310 can include an encoded representation of accessory-identifying information extracted from the accessory's digital security certificate (e.g., a hash of the manufacturer and model). Such information can be encoded in a way that is difficult or impossible for third parties to decode, e.g., using a hash function or the like. The device identity token can be any identifier that is unique across the namespace of certificate server 310 and can be uncorrelated with any accessory-identifying information (e.g., manufacturer or model).

At block 422, certificate server 310 can send the new PKI certificate and UUID (or other device identity token) to controller 302. Controller 302 can receive the new PKI certificate and UUID at block 424 and provide them to accessory 304 at block 426, e.g., by writing to an appropriate characteristic of the accessory's remote relay access service. At block 428, accessory 304 can receive and persistently store its new PKI certificate and UUID. As described below, this information can be used for authentication when accessory 304 subsequently connects to relay service 300. Controller 302 does not need to store the PKI certificate or UUID.

It will be appreciated that process 400 is illustrative and that variations and modifications are possible. Steps described as sequential may be executed in parallel, order of steps may be varied, and steps may be modified, combined, added or omitted. For instance, authentication of the controller and the accessory to certificate server 310 can occur in parallel or in a different order. In some embodiments, the PKI certificate generated during process 400 can have an expiration date and can be short-lived or long-lived as desired. Further, it is not required that certificate server 310 maintain a certificate repository, as other servers can validate the signature of certificate server 310. Different authentication techniques can be used in addition to or instead of certificate and signature validation, and the authentication information generated by certificate server 310 for accessory 304 is not limited to PKI certificates and UUIDs (or other device identifying tokens).

Upon completion of process 400, accessory 304 can be said to be "activated," that is, accessory 304 has an established identity (e.g., PKI certificate and UUID) that it can use to connect to relay service 300. Accordingly, relay pairing setup can proceed to the next stage, in which accessory 304 and controller 302 can obtain and exchange identifiers assigned by relay service 300 for use in relaying messages between them.

Figure 5:
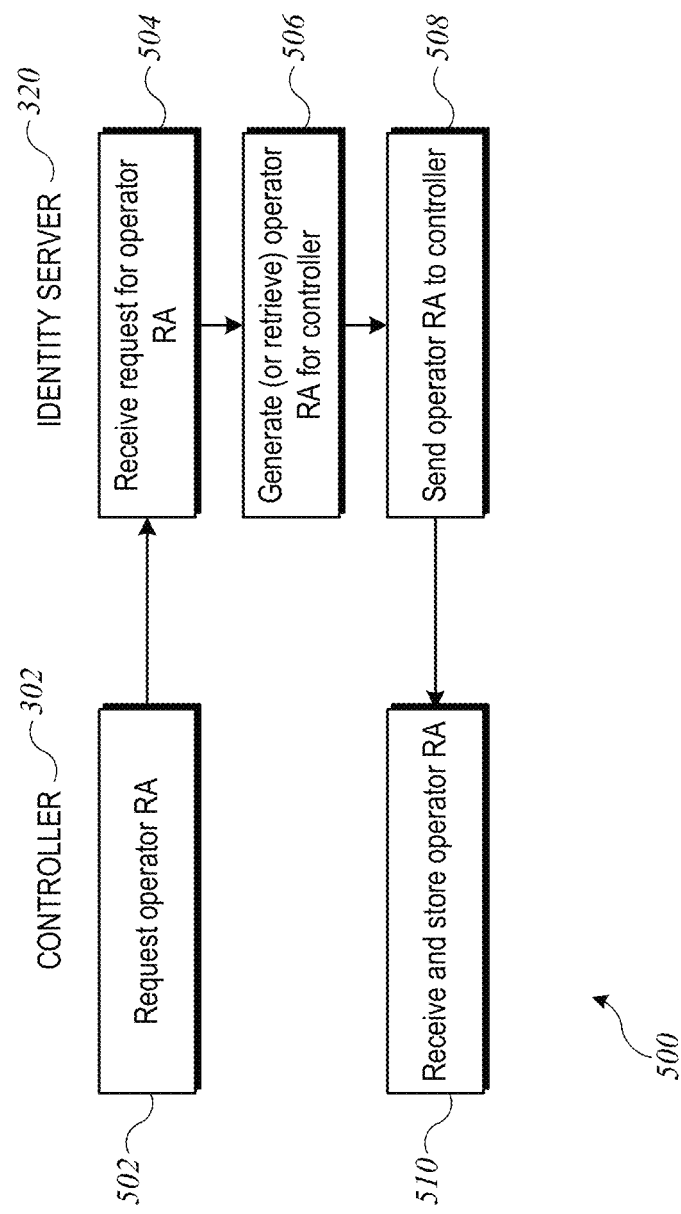
FIG. 5 shows a simplified flow diagram of a process by which a controller can obtain an operator relay alias according to an embodiment of the present invention.

FIG. 5 shows a simplified flow diagram of a process 500 by which a controller (e.g., controller 302) can obtain an operator relay alias that can be used for relaying messages to and from accessories according to an embodiment of the present invention. In embodiments described herein, the relay alias is associated with an "operator" of controller 302, who can be the user to whom controller 302 belongs, rather than with a specific controller device. This allows multiple controller devices belonging to the same user to have the same accessory access via relay server 300 without having to establish a separate relay pairing for each controller device. In other embodiments, a relay alias can be assigned to a specific controller device rather than the operator.

At block 502 of process 500, controller 302 can send a request to identity server 320 to establish an operator relay alias (or "operator RA"). This operator RA can be associated with a user of controller 302. For example, a user of controller 302 can have an account with a service provider of relay service 300 that can be used to access not only relay service 300 but also other network-based services from the same service provider, such as data storage and/or streaming services, inter-device communication services, software and/or firmware management services, etc. One example of a user account can be a user account with the iCloud service of Apple Inc. The user can link controller 302 to the user's account, e.g., by providing the username and password (or other access credentials) to controller 302, which can present the credentials to relay service 300 (e.g., to identity server 320) at block 502.

At block 504, identity server 320 can receive the request for an operator RA. In some embodiments, identity server 320 can perform various validation operations to validate the request, e.g., verifying the user account credentials provided by controller 302, performing a certificate-based authentication operation with controller 302 (e.g., using certificate server 310), etc. Assuming the request is valid, at block 506, identity server 320 can either generate or retrieve an operator RA for controller 302. For example, if this is the first time that the user has connected a controller to relay service 300, identity server 320 can generate a new operator RA and associate the operator RA with the user account. If the user has previously connected another controller to relay service 300, the user account may already be associated with an operator RA, and processing at block 506 can include retrieving the operator RA (e.g., by a lookup operation, querying a database, or the like). It should be noted that the operator RA can be used specifically for relaying messages between the user's controller(s) and various accessories; if desired, other aliases can be independently generated for other activities and operations that may be connected with the user's account. Further, the operator RA can be generated using random or pseudorandom processes or the like, such that the operator RA is not correlated with the account credentials or any other identifying information about the user, the account, or the particular controller used to generate the operator RA. In some embodiments, relay service 300 may internally be able to associate the operator RA with a user account or controller device (e.g., using a table maintained by identity server 320 or by using a reversible hash algorithm or the like to generate operator RAs), but the association need not be desirable from the operator RA without additional information.

At block 508, identity server 320 can send the generated or retrieved operator RA to controller 302. At block 510, controller 302 can receive and persistently store the operator RA. In some embodiments, a controller can use the same operator RA for all relay-service transactions as described below, and a given controller may perform process 500 once and store the resulting operator RA indefinitely.

It will be appreciated that process 500 is illustrative and that variations and modifications are possible. Steps described as sequential may be executed in parallel, order of steps may be varied, and steps may be modified, combined, added or omitted. Process 500 can be performed at any time, independently of when other processes described herein are performed. For instance, in some embodiments, an operator RA for relay service 300 can be generated whenever a user establishes an account with a relevant service provider and can be automatically delivered to each controller that the user associates with the account. Thus, for example, process 500 can be performed either before or after process 400 described above. Further, in some embodiments, the operator RA can be associated with a specific controller rather than just with a user account, so different controllers belonging to the same user can have different operator RAs.

Figure 6:
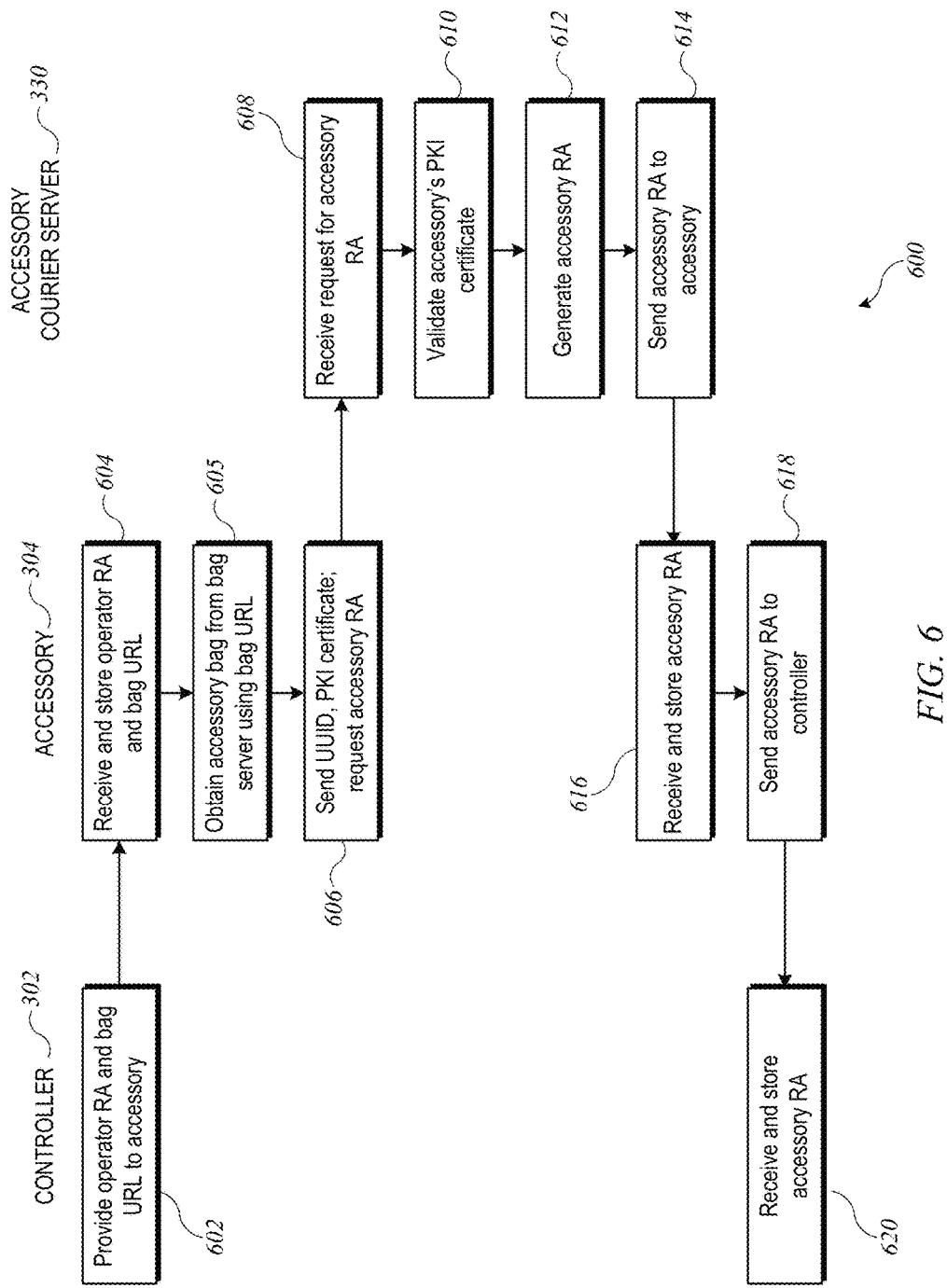
FIG. 6 shows a simplified flow diagram of a process for exchanging operator and accessory relay aliases according to an embodiment of the present invention.

To enable relay service 300 to operate between controller 302 and accessory 304, controller 302 needs to provide its operator RA to accessory 304 and obtain an accessory relay alias (or "accessory RA") for accessory 304. FIG. 6 shows a simplified flow diagram of a process 600 for exchanging operator and accessory RAs according to an embodiment of the present invention. Process 600 can be performed in part, e.g., by controller 302 interacting with accessory 304, and in part, e.g., by accessory 304 interacting with accessory courier server 330. It is assumed that process 600 is performed at a time when controller 302 has local access to accessory 304, so that communication between controller 302 and accessory 304 can occur via a local channel without the use of relay service 300.

Process 600 can begin when controller 302 has an operator RA (e.g., as a result of process 500) and accessory 304 has a PKI certificate and UUID (e.g., as a result of process 400). At block 602, controller 302 can provide its operator RA, e.g., by writing to an appropriate characteristic (or characteristics) of the remote relay access service. In some embodiments, controller 302 can also provide a "bag URL" that the accessory can use to obtain an accessory bag from bag server 380, e.g., by writing to an appropriate characteristic (or characteristics) of the remote relay access service. In some embodiments, the URL for bag server 380 can be determined from information in a controller bag held by controller 302. At block 604, accessory 304 can receive and persistently store the operator RA (and bag URL if provided). Assuming the operator RA is received via a pair-verified session on a local channel, accessory 304 can associate the operator RA with the controller identifier that was used to establish the pair-verified session on the local channel. While such association is not required, doing so can allow a controller that has established admin privileges for its local pairing with accessory 304 to have the same admin privileges when communicating via relay service 300. Further, associating an operator RA with a local pairing can allow accessory 304 to restrict relay access to controllers that have established a local pairing.

At block 605, accessory 304 can obtain an accessory bag from bag server 380, e.g., by sending a GET request to the bag URL provided by controller 302. In some embodiments, the accessory bag can include addressing information for various servers of relay service 300, e.g., any or all of accessory courier server 330 and/or pass server 360. In some embodiments, the accessory bag can include expiration information; subsequently to process 600, accessory 304 can determine whether and when to obtain a new accessory bag based on the expiration Having received an operator RA, accessory 304 can proceed to obtain an accessory RA. For example, at block 606, accessory 304 can send a request for an accessory RA to accessory courier server 330. In some embodiments, the request can include the PKI certificate and UUID (or other device identifying token) obtained via process 400 described above; alternatively, the PKI certificate and UUID can be sent in a separate transaction. In some embodiments, accessory 304 can be required to present a pass to accessory courier server 330 in connection with the request. Accessory 304 can obtain a pass from pass server 360, e.g., as described below with reference to FIG. 12.

At block 608, accessory courier server 330 can receive the request. At block 610, accessory courier server 330 can validate the accessory's PKI certificate. In some embodiments, accessory courier server 330 can communicate with certificate server 310 to validate the accessory's PKI certificate; in other embodiments, courier server 330 can validate based on the signature on the accessory's PKI certificate. At block 612, assuming the PKI certificate is validated, accessory courier server 330 can generate an accessory RA for accessory 304. In some embodiments, the accessory RA can be generated using random or pseudorandom processes or the like, such that the accessory RA is not correlated with any identifying information about the accessory. In some embodiments, the accessory RA can incorporate the UUID, e.g., in an encrypted data block, to allow relay service 300 to connect the accessory RA with the UUID without also enabling third parties to do so. The accessory RA can be generated such that it is unique across all currently valid accessory RAs. At block 614, accessory courier server 330 can send the accessory RA to the accessory, e.g., as a response to the request received at block 608.

At block 616, accessory 304 can receive the accessory RA from accessory courier server 330. Accessory 304 can persistently store the accessory RA and use it for future connections to accessory courier server 330. At block 618, accessory 304 can send its accessory RA to controller 302. For example, controller 302 can include a request for the accessory RA at block 602 when it sends the operator RA to accessory 304, and accessory 304 can send a response to the request at block 618. Other techniques can also be used.

At block 620, controller 302 can receive and store the accessory RA. In some embodiments, controller 302 can store the accessory RA in association with the accessory identifier that was used to establish the pair-verified session on the local channel, via which the accessory RA is received. This can allow controller 302 to access accessory 304 interchangeably via either a local channel or relay service 300.

It will be appreciated that process 600 is illustrative and that variations and modifications are possible. Steps described as sequential may be executed in parallel, order of steps may be varied, and steps may be modified, combined, added or omitted. A controller and accessory can obtain and exchange operator RA and accessory RA at any time and in either order For instance, it should be noted that accessory 304 does not use the operator RA in obtaining its accessory RA during process 600. Accordingly, it is possible for accessory 304 to obtain an accessory RA at any time after receiving a PKI certificate and UUID. Having the accessory's request to accessory courier server 330 triggered on receiving the operator RA from the controller can allow controller 302 to exert more control over when or whether accessories request accessory RAs. In some embodiments, accessory 304 can use the same accessory RA for pairings with different controllers, and an accessory that already has an accessory RA does not need to request another one during the process 600.

Upon completion of process 600, accessory 304 and controller 302 are each in possession of an (accessory RA, operator RA) pair. Relay service 300 has associated the accessory RA with accessory 304, at least to the extent that accessory courier server 330 can pass messages to accessory 304 based on the accessory RA, and has associated the operator RA with controller 302, at least to the extent that controller courier server 340 can pass messages to controller 302 based on the operator RA.

At this point, it is possible to establish an association between the accessory RA and operator RA within relay service 300, such that relay service 300 can begin to permit messages to be relayed between accessory 304 and controller 302. This association is referred to herein as a "relay pairing," and is to be understood as being distinct from local pairing established by operations such as pair setup and pair add described above.

Figure 7:
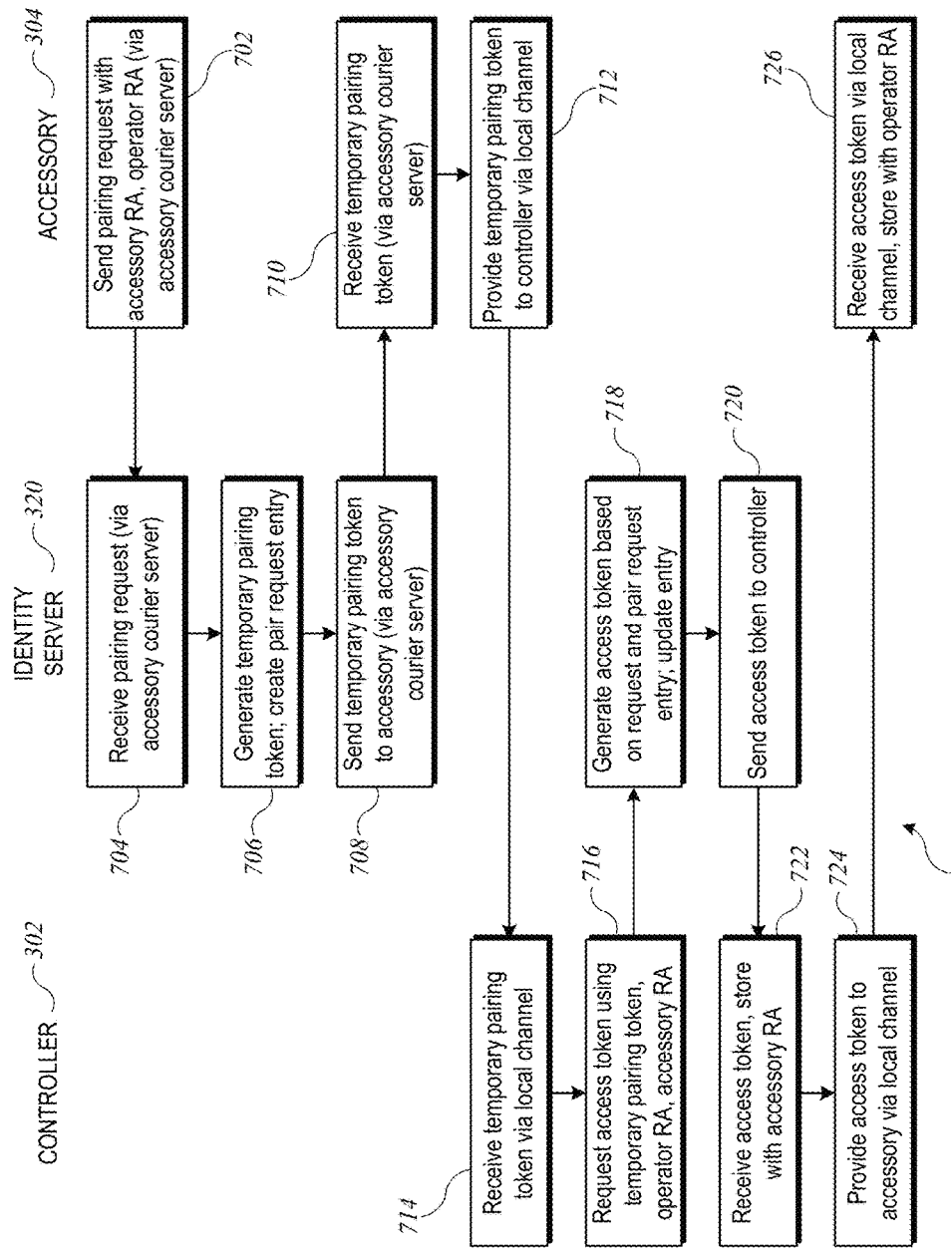
FIG. 7 shows a simplified flow diagram of a process for relay pairing according to an embodiment of the present invention.

FIG. 7 shows a simplified flow diagram of a process 700 for establishing a relay pairing according to an embodiment of the present invention. Process 700 can be performed in part by controller 302 communicating with identity server 320, in part by controller 302 communicating with accessory 304 via a local channel, and in part by accessory 304 communicating with identity server 320 (which can occur via accessory courier server 330). It is assumed that controller 302 and accessory 304 each have the (accessory RA, operator RA) pair corresponding the two devices, e.g., as a result of performing processes 400, 500, and 600.

In this example, at block 702, accessory 304 can send a pairing request (e.g., via accessory courier service 330, not shown) to identity server 320. The pairing request can include the (accessory RA, operator RA) pair. At block 704, identity server 320 can receive the request. In some embodiments, controller 302 can instruct accessory 304 to send the pairing request in response to receiving the accessory RA at block 620 of process 600 described above. At block 706, identity server 320 can generate a temporary pairing token to be associated with the pairing request. The temporary pairing token can include, for example, the operator RA, the accessory RA, a timestamp indicating when the temporary pairing token was generated, and an expiration time (which can be, e.g., 10 minutes or 1 hour or the like after the generation time). In some embodiments, the temporary pairing token can be encrypted or digitally signed using a key known only to identity server 320. Identity server 320 can also generate a pair request entry, which can be, e.g., an entry in token repository 322 that includes the accessory RA, operator RA, and the temporary paring token; the pair request entry can be a temporary entry that is removed if the expiration time is reached without completing the relay pairing process. At block 708, identity server 320 can send the temporary pairing token to accessory 304 (e.g., via accessory courier service 330). At block 710, accessory 304 can receive the temporary pairing token.

At block 712, accessory 304 can provide the temporary pairing token to controller 302 via the local channel. For example, accessory 304 can update an appropriate characteristic of the remote relay access service, and controller 302 can receive a notification of the update. As another example, accessory 304 can initiate block 702 in response to a request from controller 302, and the temporary pairing token can be sent in response to that request at block 712. Controller 302 can receive the temporary pairing token at block 714.

At block 716, controller 302 can send a request for an access token (which can be a persistent pairing token distinct from the temporary pairing token) to identity server 320. The request can include the operator RA, the accessory RA, and the temporary pairing token. In some embodiments, the request at block 714 can also include other information, e.g., information usable to verify the identity of controller 302 with certificate server 310 (or another certificate server, such as a server dedicated to verifying identity of controllers).

At block 718, identity server 320 can generate an access token based on the request from controller 302. In some embodiments, processing at block 718 can include verifying the identity of controller 302 and/or verifying that the information included in the request (including the temporary pairing token) matches the pair request entry created at block 706. Assuming all verifications succeed, identity server 320 can generate an access token (which can be a persistent pairing token distinct from the temporary pairing token). The access token can include, e.g., a timestamp indicating when it was generated, an expiration timestamp (if desired), the operator RA, the accessory RA, a flag indicating whether the operator RA is granted admin privilege for the accessory (which can be set to true in this case), and other information as desired. In some embodiments, the access token can include a version of the information that is digitally signed by identity server 320, thereby providing an access token that is not readily forged. At block 720, interaction server 320 can send the access token to controller 302.

At block 722, controller 302 can receive the access token and can persistently store the access token in association with the accessory RA of accessory 304. In some embodiments, controller 302 can associate the access token and accessory RA with a (presumably different) accessory identifier and accessory long-term public key used for local access, so that controller 302 knows that the local identifier and the accessory relay alias both refer to the same accessory. At block 724, controller 302 can provide the access token to accessory 304 via the local channel. At block 726, accessory 304 can receive the access token and can persistently store the access token in association with the operator RA of controller 302; as noted above, the operator RA of controller 302 can be associated with a (presumably different) controller identifier and controller long-term public key used for local access, so that accessory 304 knows that both the local controller identifier and the operator relay alias refer to the same controller.

It will be appreciated that process 700 is illustrative and that variations and modifications are possible. Steps described as sequential may be executed in parallel, order of steps may be varied, and steps may be modified, combined, added or omitted. In some embodiments, process 700 can be initiated on request of a controller device.

Further, processes 400, 500, 600, and 700 (or portions thereof) can be performed in a different order from that described. As noted above, certain operations within these processes may require communication between controller 302 and accessory 304 on a local channel; however, it is not required that the local channel be continuously maintained throughout execution of the various processes involved in establishing a relay pairing. For instance, a controller can start the process while in the local environment with the accessory, then leave the local environment and return later to finish. Further, in embodiments where local access to an accessory is granted based on a user identifier rather than a specific device identifier, relay pairing setup can be started using one controller device and finished using a different controller device operated by the same user.

An access token can be persistently stored and used indefinitely. In some embodiments, an access token can have an expiration date set by the server that generates it, either by default or based on an instruction from the controller. Thus, for example, an access token can be provided to allow a controller to have relay access to an accessory on a temporary basis (e.g., the controller might belong to a house-sitter or the like).

In some embodiments, the relay pairing setup processes described above can be used to establish a relay pairing between a controller that has admin privilege (as established through local pairing) and an accessory. The processes can be repeated to establish relay pairings between a controller and any number of accessories, provided that the controller has admin privilege as to each accessory. For controllers (or operators) that do not have admin privilege, a different process can be used to add relay pairings; an example is described below.

Relay Use Examples

Once established, a relay pairing can be used at any time to relay messages between a controller and an accessory. As noted above, the messages can conform to a uniform accessory protocol that can support a request/response model for allowing the controller to interrogate (e.g., via a read request) or modify (e.g., via a write request) various aspects of accessory state (modeled, e.g., as characteristics that can be readable and/or writeable by controllers). In addition, the uniform accessory protocol can support notification by an accessory to one or more controllers when some aspect of accessory state changes. In accordance with some embodiments of the present invention, uniform accessory protocol messages can be exchanged via relay service 300.

In some embodiments, relay service 300 may limit the size of a relay request; for example, a single relay request payload may be limited to not more than 4 kB (kilobytes), 16 kB, or the like. Some uniform accessory protocol messages may exceed this limit (e.g., 500 kB to read an accessory attribute database). Where this is the case, messages can be fragmented into multiple relay request payloads by the sender (e.g., controller 302 or accessory 304). Each message fragment can include a portion of the message as well as fragmentation header information to facilitate reassembly of the fragments. The fragmentation header information can include, for instance, a transaction identifier (e.g., a 16-bit monotonically increasing integer) that is common to all fragments of a message and distinguishes different messages from each other; a transaction length indicator (e.g., the number of bytes in the complete message), and an index (e.g., a byte index indicating the location of the first byte of this fragment within the complete message). The recipient of a fragmented message (e.g., accessory 304 or controller 302) can use the transaction length indicator to allocate buffer space for the message and can assemble the message by writing each message fragment into the allocated buffer space based on the index. The recipient can use the transaction length indicator to determine when all bytes have been received. Thus, fragments of a message can be received out of order and placed back into order by the recipient.

Figure 8A:
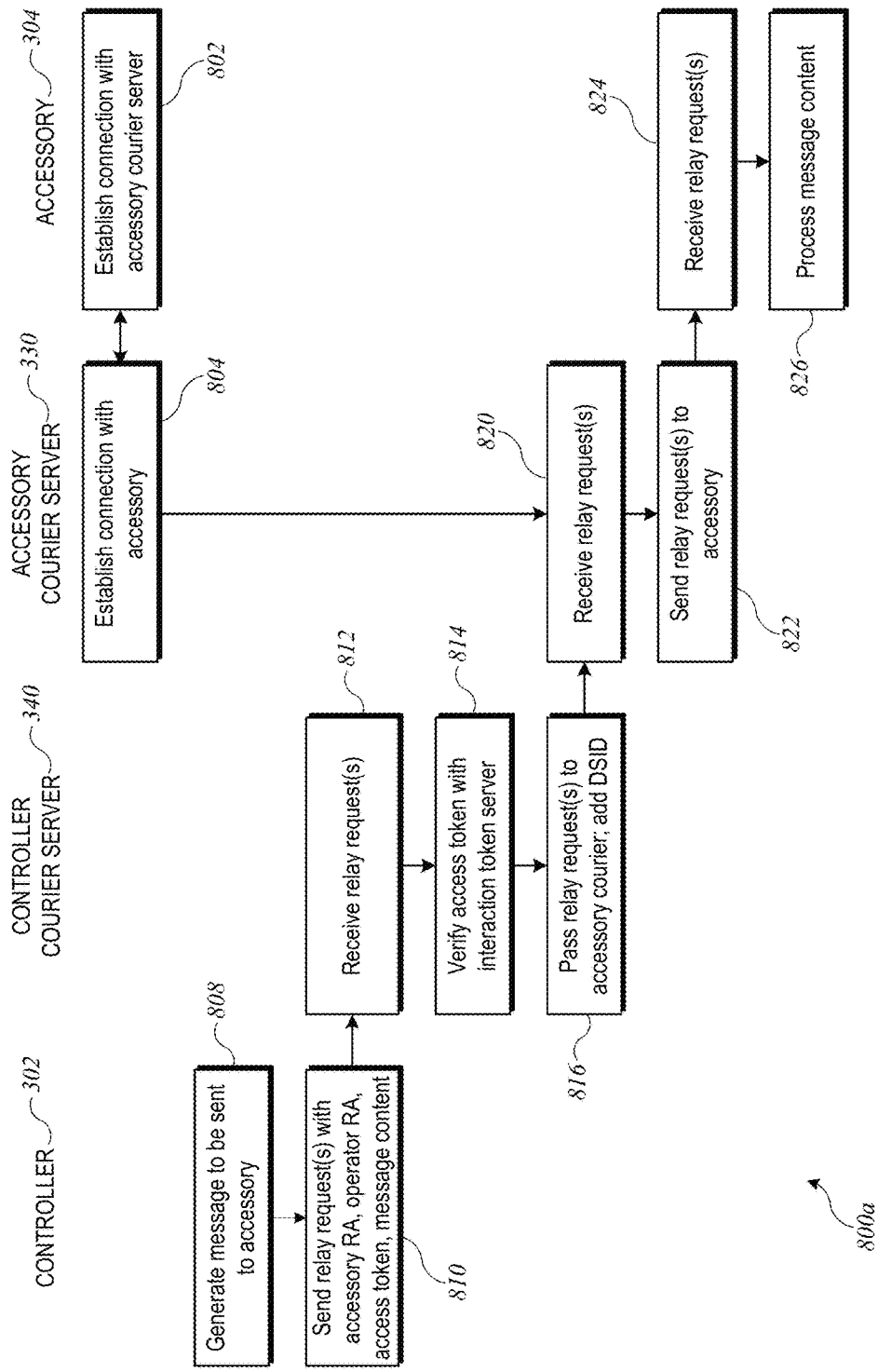
FIGS. 8A and 8B show simplified flow diagrams of processes for communicating request and response messages between a controller and an accessory via a relay service according to an embodiment of the present invention.
Figure 8B:
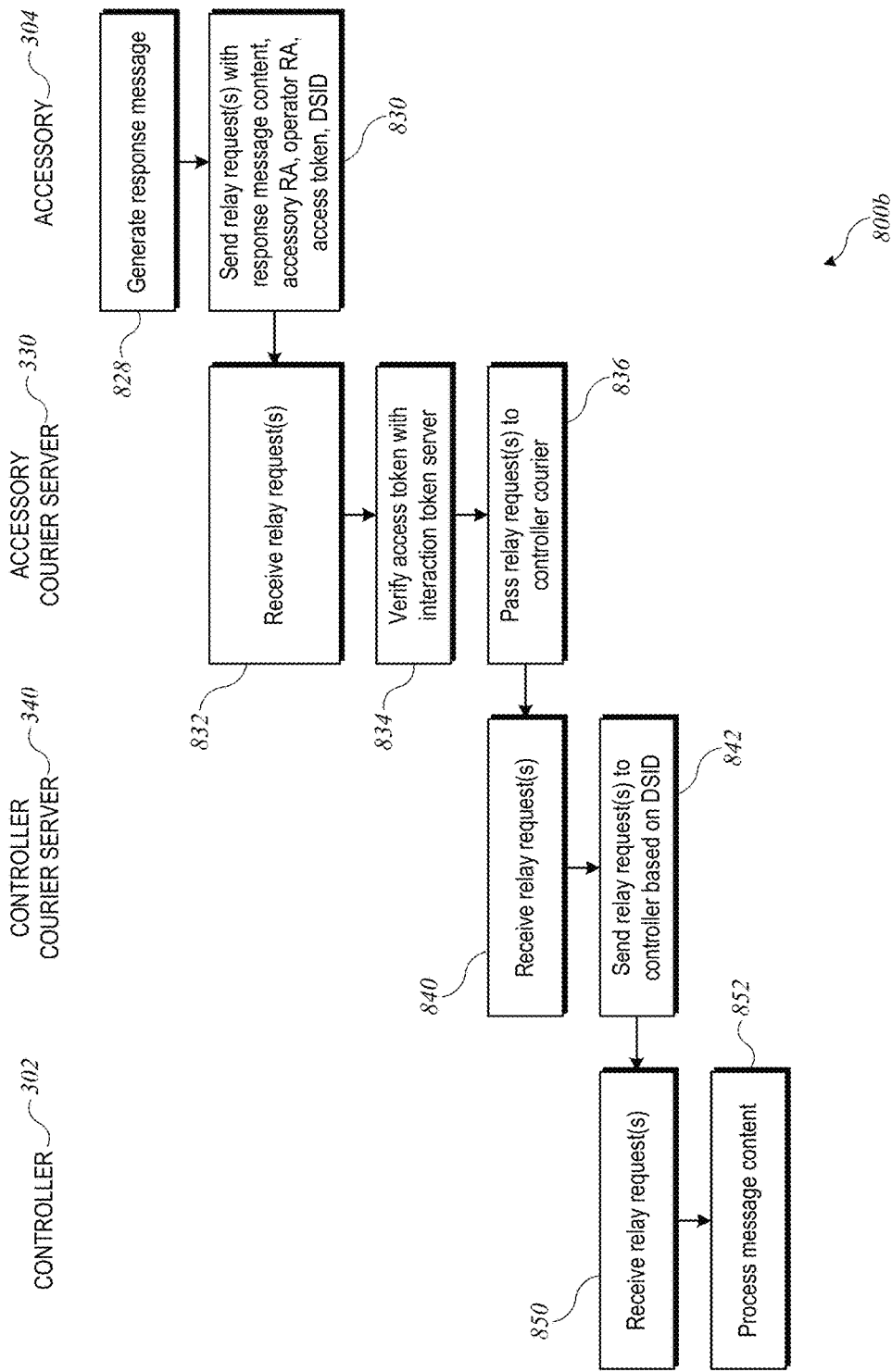

FIGS. 8A and 8B show simplified flow diagrams of processes 800a, 800b for communicating requests (process 800a) and responses (process 800b) between a controller (e.g., controller 302) and an accessory (e.g., accessory 304) via a relay service (e.g., relay service 300) according to an embodiment of the present invention. In this example, it is assumed that a relay pairing has been established (e.g., as described above with reference to FIGS. 4-7), so that identity server 320 has a pairing record in token repository 322 that associates an operator RA of controller 302, an accessory RA of accessory 304, and a pairing token.

FIG. 8A shows process 800a for communicating a request from controller 302 to accessory 304. At blocks 802 and 804, accessory 304 can establish a (persistent) connection with accessory courier server 330. For example, accessory 304 can establish a socket with accessory courier server 330; the socket can be mapped to the accessory RA of accessory 304 (e.g., in mapping 332). To keep the socket open, accessory 304 can send a request (e.g., a long-poll in HTTP) to accessory courier server 330; the request can include the access token for any controller with which accessory 304 has a relay pairing. In some instances, an accessory can have relay pairings with multiple controllers, and the request can include multiple access tokens, provided that the access tokens are associated with the same accessory RA.

At block 808, controller 302 can generate a message to be sent to accessory 304. The message can include, e.g., a read or write request message conforming to the uniform accessory protocol. Block 808 can occur whenever controller 302 determines that a message should be communicated to accessory 304. For example, the user may operate controller 302 to request information about accessory 304 (e.g., "is the front door locked?") or to change the state of accessory 304 (e.g., "lock the front door"). Alternatively, controller 302 may determine on its own initiative to send a message to accessory 304 (e.g., as a result of an automated process).

At block 810, controller 302 can send one or more relay requests to controller courier service 340. The relay request (s) can include the message content generated at block 808. In some embodiments, a message may be fragmented into multiple relay requests, e.g., as described above, and each relay request can include a fragment of the message content and a fragmentation header. Along with the message content (or fragment thereof), the relay request(s) can include an indicator that the request is a relay request, the accessory RA for accessory 304, the operator RA for controller 302, and the access token for the relay pairing between controller 302 and accessory 304. Block 810 can occur whenever controller 302 determines that a message generated at block 808 should be relayed to accessory 304 via relay service 300. For example, having determined that a message should be sent, controller 302 may further determine that local access to accessory 304 is not currently available and that a relay pairing has been established with accessory 304 so that access via relay service 300 is an option. In such cases, controller 302 can proceed to generate the request at block 810.

At block 812, controller courier server 340 can receive the relay request(s) from controller 302. In some embodiments, controller courier server 340 may implement or support a number of different messaging services for controllers and/ or other user devices (e.g., a controller-to-controller messaging service) in addition to relay services described herein, and receiving each relay request can include determining (e.g., based on an indicator included in the request) that this request is to relay a message to an accessory.

At block 814, controller courier server 340 can verify the access token (e.g., by communicating with identity server 320, which can validate its digital signature on the access token and confirm that the access token is associated with the operator RA and accessory RA included in the relay request). Other validation operations, e.g., verifying the identity of controller 302, can also be performed. Validation can be performed independently for each relay request; controller courier server 340 can be agnostic to message fragmentation. Assuming the validation operations succeed, at block 816, controller courier server 340 can pass each relay request to accessory courier server 330. In some embodiments, controller courier server 340 can add a device-specific identifier (DSID) to the request, which can be any identifier usable by controller courier server 340 to identify the specific controller device 302 from which a relay request was received. This can allow any response to a relay request to be selectively delivered to the controller device that made the request, rather than to all controller devices associated with a particular operator RA, as described below. Passing of the relay request(s) can be facilitated by message passing server 350 and can include reformatting the relay request(s), etc.

At block 820, accessory courier server 330 can receive the relay request(s). At block 822, accessory courier server 330 can send the relay request(s) to accessory 304, e.g., as a response to a previous long-poll request from accessory 304 (as described above). Accessory courier server 330 can be agnostic to the content of the request(s). The relay request(s) as sent to accessory 304 can include the message content (and fragmentation header if applicable) provided by controller 302, the accessory RA, the operator RA, and the DSID added by controller courier server 340. The access token can be omitted; accessory 304 presumably already has a copy of the access token. In some embodiments, if accessory 304 is not connected to accessory courier server 340 when a relay request is received, the request can be discarded, and accessory courier server 340 can report an error to controller courier server 330.

At block 824, accessory 304 can receive the relay request (s), including the message content provided by controller 302. If the message was fragmented across multiple relay requests, accessory 304 can parse the fragmentation header and reassemble the complete message, e.g., in a buffer or other short-term memory. At block 826, accessory 304 can process the message. It should be noted that the message content can be relayed exactly as received, so that accessory 304 can process the message in the same manner as it would process a message sent via a local channel.

FIG. 8B shows process 800b for communicating a response from accessory 304 to controller 302. Process 800b can be used, e.g., whenever accessory 304 determines that a response should be sent to controller 302. In some embodiments, processing message content at block 826 of process 800a can result in accessory 304 generating a response message to be sent to controller 302. For instance, in the case of a read request message, the response message can include the values of the characteristic(s) requested to be read; in the case of a write request message, the response message can indicate success or failure. It is to be understood that not every request message requires a separate response; in some instances, accessory 304 can consolidate responses to multiple requests. Further, some request messages may generate multiple response messages. For instance, in cases where a request may take some time to complete (e.g., opening a garage door), the accessory may send a first response confirming receipt of the request and a second response indicating completion of the request, or the accessory may wait and send a single response when the request is completed. In some embodiments, some requests may be processed without sending a response.

When a response message is to be sent, accessory 304 can generate response message content to be sent to controller 302 at block 828. At block 830, accessory 304 can send one or more relay request(s) to accessory courier server 330 to relay the response message to controller 302. The relay request(s) can be, e.g., HTTP or HTTPS request(s) that include the response message content intended for controller 302 (e.g., a message supported by the uniform accessory protocol). In some embodiments, a response message may be fragmented into multiple relay requests, e.g., as described above, and each relay request can include a fragment of the response message content and a fragmentation header. Along with the response message content (or fragment thereof), the relay request(s) to accessory courier server 330 can include an indicator that the request is a relay request, the operator RA for controller 302, the accessory RA for accessory 304, and the access token for the relay pairing between controller 302 and accessory 304. Other information, such as the DSID for controller 302, can be included. The relay request(s) need not be identified as being responsive to a previous relay request that was relayed from controller 302.

At block 832, accessory courier server 330 can receive the relay request(s) from accessory 304 and can determine that it is a relay request. At block 834, accessory courier service 330 can verify the access token (e.g., by communicating with identity server 320, which can validate its digital signature on the access token and confirm that the access token is associated with the accessory RA and operator RA included in the relay request). Other validation operations can also be performed. Token verification (and any other validation operations) can be performed independently for each relay request; accessory courier server 330 can be agnostic to message fragmentation. Assuming the token verification (and any other validation operations) succeed, at block 836, accessory courier server 330 can pass each relay request to controller courier server 340. Passing of the relay request(s) can be facilitated by message passing server 350 and can include reformatting the request, etc.

At block 840, controller courier server 340 can receive the relay request(s). At block 842, controller courier server 340 can send the relay request(s) to controller 302. In some embodiments, controller courier server 340 can use the DSID included in the relay request(s) to direct the relay request(s) to the specific controller device identified by the DSID; controller courier server 340 can be agnostic to the content of the relay request(s). Assuming controller 302 is online, controller 302 can receive the relay request(s) at block 850. In some embodiments, relay requests that contain response messages from an accessory are not queued by controller courier server 340; if controller 302 is offline, the response message may be discarded.

The relay request(s) as received by controller 302 at block 850 can include the message content (and fragmentation header if applicable) provided by controller 302. If the message was fragmented across multiple relay requests, controller 302 can parse the fragmentation header and reassemble the complete message, e.g., in a buffer or other short-term memory. At block 852, controller 302 can process the response message content. As with request messages sent by controller 302, response message content from accessory 304 can be relayed exactly as sent, so that controller 302 can process the response message in the same manner as it would process a response message sent via a local channel. Processing of a response message might or might not lead to a further request message.

Proceeding in this manner, controller 302 and accessory 304 can exchange any messages supported by a uniform accessory protocol. For example, by exchanging messages via relay service 300, controller 302 and accessory 304 can establish a pair-verified session (based on their previously-established local pairing) and can encrypt subsequent messages using a session key associated with the pair-verified session. In some embodiments, accessory 304 can refuse any requests to read or write various characteristics that are not received within the context of a pair-verified session. Accordingly, end-to-end security between controller 302 and accessory 304 can be provided.

Another type of message exchange can be an accessory notification. In some embodiments, a notification can include any message sent by an accessory that is not in response to a request message from a controller. For example, the uniform accessory protocol may provide that a controller (e.g., controller 302) can subscribe to notifications of state changes occurring at accessory 304. The subscription can be at a global level (e.g., notify controller 302 of any state change) or specific to a particular characteristic (or characteristics). When a state change occurs in a characteristic for which one or more controllers have subscribed to notifications, accessory 304 can generate a notification to each subscribed controller. Another circumstance in which a notification can be sent may include a configuration change to the accessory, such as when a new accessory is added to a bridge. Still another circumstance may occur if the controller has requested periodic updates as to the state of the accessory (e.g., an hourly temperature reading). Depending on implementation, any of these or other circumstances can result in an accessory generating a notification to one or more controllers. The particular content of a notification message can depend on the controller and/or the transport; examples are described in above-referenced U.S. application Ser. No. 14/614,914 and U.S. application Ser. No. 14/725,891.

Figure 9:
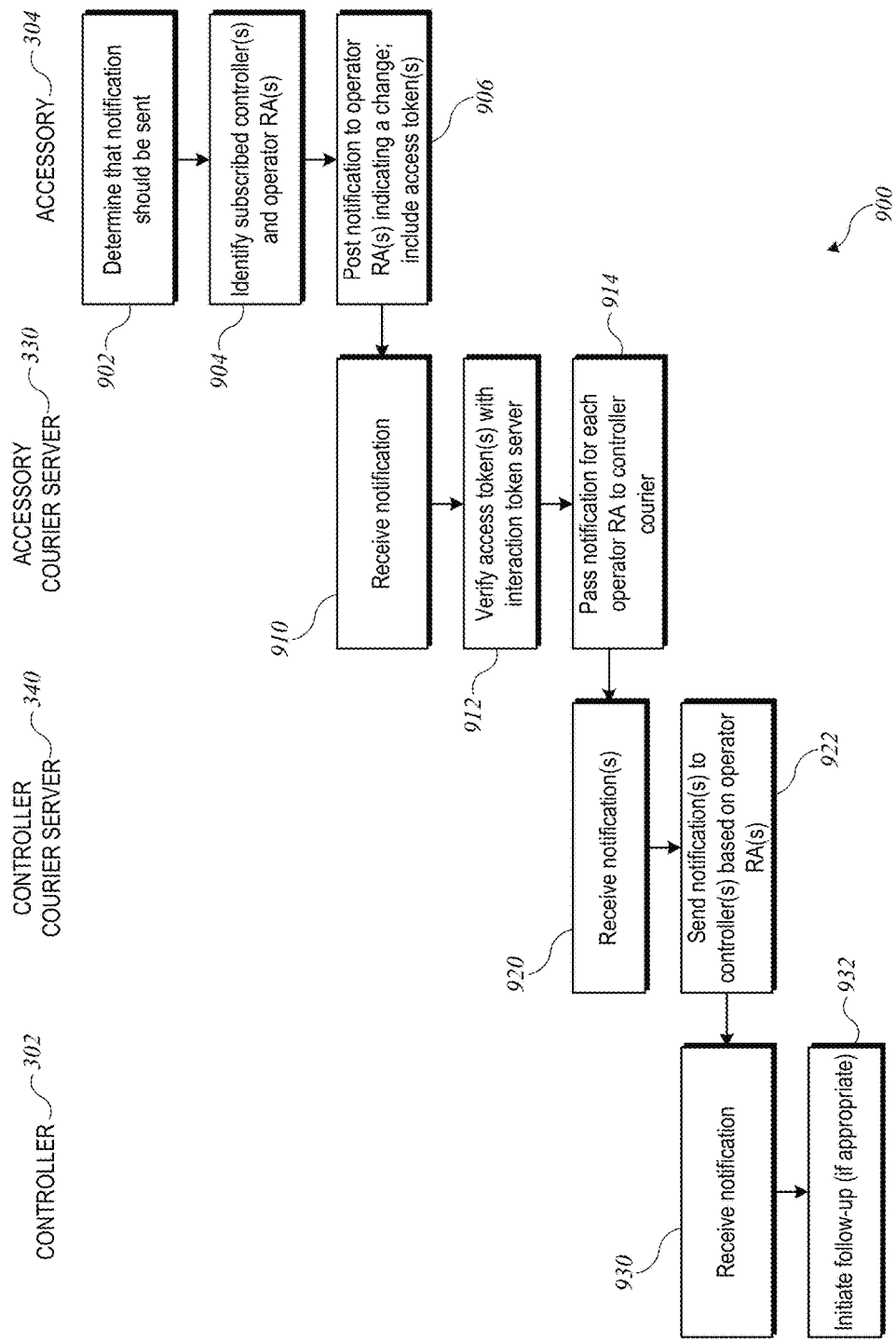
FIG. 9 shows a simplified flow diagram of a process for relaying a notification from an accessory to a controller via a relay service according to an embodiment of the present invention.

In some embodiments of the present invention, relay service 300 can be used to relay notifications from an accessory to subscribed controllers. FIG. 9 shows a simplified flow diagram of a process 900 for relaying a notification from an accessory (e.g., accessory 304) to a controller (e.g., controller 302) via a relay service (e.g., relay service 300) according to an embodiment of the present invention. As with FIGS. 8A and 8B, in this example, it is assumed that a relay pairing has been established (e.g., as described above with reference to FIGS. 4-7), so that identity server 320 has a pairing record in token repository 322 that associates an operator RA of controller 302, an accessory RA of accessory 304, and a pairing token.

At block 902, accessory 304 can determine that a notification should be sent For example, if accessory 304 implements a door lock, a state change can be from a locked state to an unlocked state (or vice versa). Any other aspect of accessory state that can change can also be detected. In some embodiments, the accessory can update a value of one of the characteristics of its accessory model to represent the state change. As noted above, events or circumstances other than a state change can also result in generation of a notification, and process 900 can be performed whenever a notification is to be sent.

At block 904, accessory 304 can identify one or more controllers (e.g., controller 302) that should be notified of a state change via relay service 300. For example, in some embodiments, a controller can write to a "subscriptions" characteristic of the accessory model to establish (or terminate) a subscription to be notified in the event of a state change, either globally or for a specified subset of characteristics. Based on the subscriptions characteristic(s) in its accessory model, accessory 304 can determine whether any controllers are to be notified. (If no controllers are to be notified, process 900 can end at block 904.) In some embodiments, having determined that one or more controllers (e.g., controller 302) are to be notified, accessory 304 may further determine that local access to controller 302 is not currently available and that a relay pairing has been created with controller 302 so that access via relay service 300 is an option. In such cases, accessory 304 can proceed to post a notification to controller 302 at block 906. In some embodiments, the posted notification can be sent, e.g., as an HTTP or HTTPS POST request to a designated URL at accessory courier server 330. The posted notification can include an indicator to indicate generally the type of circumstance that occurred (e.g., a state change, configuration change, new sensor reading available) without providing any further information (e.g., what changed or what the new reading is). The posted notification can also include the accessory RA and a list of operator RAs and associated access tokens for controllers to which the notification should be relayed. A single notification can be posted for any number of controllers.

At block 910, accessory courier server 330 can receive the posted notification. In some embodiments, accessory courier server 340 can distinguish posted notifications from relay requests (e.g., they can be posted to different URLs). At block 912, accessory courier server 330 can verify the access token(s) (e.g., by communicating with identity server 320, which can validate its digital signature on each access token and confirm that each access token is correctly associated with the accessory RA and operator RA specified by accessory 304). Assuming the access token for a particular operator RA is valid, at block 914, accessory courier server 330 can pass a notification message for that operator RA to controller courier server 340. Passing of the notification message can be facilitated by message passing server 350 and can include reformatting the notification message, etc.

At block 920, controller courier server 340 can receive the notification message (or messages as the case may be). At block 922, controller courier service can send each received notification message to an appropriate controller (e.g., controller 302) based on the operator RA. Where the operator RA maps to a user account rather than a specific controller device, this can result in sending notifications to multiple controller devices associated with the same user account. In some embodiments, notification messages can be queued by controller courier server 340 for later delivery if controller 302 is offline. Queued notification messages can be retained as long as desired before discarding (e.g., 7 days, 30 days, or some other time period). Queuing of notifications can be independent of whether other accessory-originated relay requests are queued.

At block 930, controller 302 can receive the notification message from controller courier server 340. As noted above, the notification message can indicate generally the type of circumstance that occurred (e.g., a state change, configuration change, new sensor reading available) without providing any further information (e.g., what changed or what the new reading is). Controller 302 can, if desired, obtain information about the nature of the state change by initiating a message to accessory 304 at block 932. The message can be, e.g., a read request to read characteristics of interest to determine further information about the state change. The message can be sent to accessory 304 in the same manner as any other read request (or write request), e.g., using process 800a described above to relay the message via relay service 300.

It will be appreciated that processes 800a, 800b, and 900 are illustrative and that variations and modifications are possible. Steps described as sequential may be executed in parallel, order of steps may be varied, and steps may be modified, combined, added or omitted. For instance, an accessory can use process 800b to send a message to a particular controller device that is not responsive to a request message from that device; provided that the accessory has a device-specific identifier of the controller, the message need not be responsive to a request message. As another example, if the accessory has a device-specific identifier for a particular controller device, a notification sent using process 900 can be directed to a specific controller device.

The message formats used within relay service 300 can be such that relay service 300 does not know that a particular message originating from accessory 304 is a response to a controller message, or to any specific controller message. Message content can be generated by the originating endpoint device (either controller 302 or accessory 304 as the case may be) and can be opaque to relay service 300. Thus, for example, controller 302 and accessory 304 can exchange messages conforming to the uniform accessory protocol to establish a pair-verified session with each other and to communicate encrypted information within the pair-verified session. In some embodiments, a message identifier (message ID) can be assigned to each message, either by the originating endpoint (controller 302 or accessory 304) or by relay service 300. The message ID can be delivered to the recipient and can be used by the recipient, e.g., to associate a response message with the request message (or multiple request messages) to which the response is responsive.

If an attempt to relay a message fails at any point, a failure response can be generated and delivered to the endpoint device that sent the relay request. The endpoint device that receives the failure response can determine whether to retry, alert the user, take other action, or take no action.

Accessory 304 can maintain a persistent connection (e.g., socket) to accessory courier service 330. For example, as described above, accessory 304 can send an HTTP long-poll request to accessory courier server 330 in order to keep the connection open, and accessory courier server 330 can deliver a relayed message as a response to the long-poll request. Any time accessory 304 receives a response to a long-poll request, it can generate and send another long-poll request, thereby allowing the connection to persist indefinitely. In examples described herein, the connection to accessory courier server 330 is established based on a request (e.g., a long-poll) received at accessory courier server 330 from accessory 304 that includes the accessory RA (and access token for each controller 302 from which accessory 304 is able to receive messages). Accessory courier server 330, and relay service 300 more generally, need not provide a mechanism for delivering requests to accessories that are not currently connected. Thus, accessory courier server 330 does not need to retain any information as to where or how to locate accessory 304; as long as accessory 304 maintains a connection (e.g., socket) to accessory courier server 330, the presence of the socket is sufficient to allow accessory courier server 330 to deliver requests. It should be noted that, given this implementation, if accessory 304 does not maintain a connection to accessory courier server 330, relay service 300 may be unable to complete a relay request from controller 302.

In some embodiments, relay service 300 can keep a log of activity at various servers. For example, when controller courier server 340 (and/or accessory courier server 330) relays a message, the accessory RA, operator RA, and direction of the message (controller-to-accessory or accessory-to-controller) can be recorded; the message content need not be recorded. This can allow relay service 300 to monitor activity levels and detect patterns (e.g., trends in usage, anomalies as described below) without having a record of what information was sent. Keeping any log or activity record is optional.

Adding and Removing Users

In some embodiments, it may be desirable to allow multiple users (or multiple controllers) to interact with an accessory, via local access and/or via relay service 300. In the context of local access, a controller that has admin privilege as to a particular accessory can add other controllers using a pair add process of the uniform accessory protocol. In the context of relay service 300, a controller that has admin privilege as to a particular accessory can add relay pairings with other operator RAs (e.g., operator RAs that belong to different users).

Figure 10A:
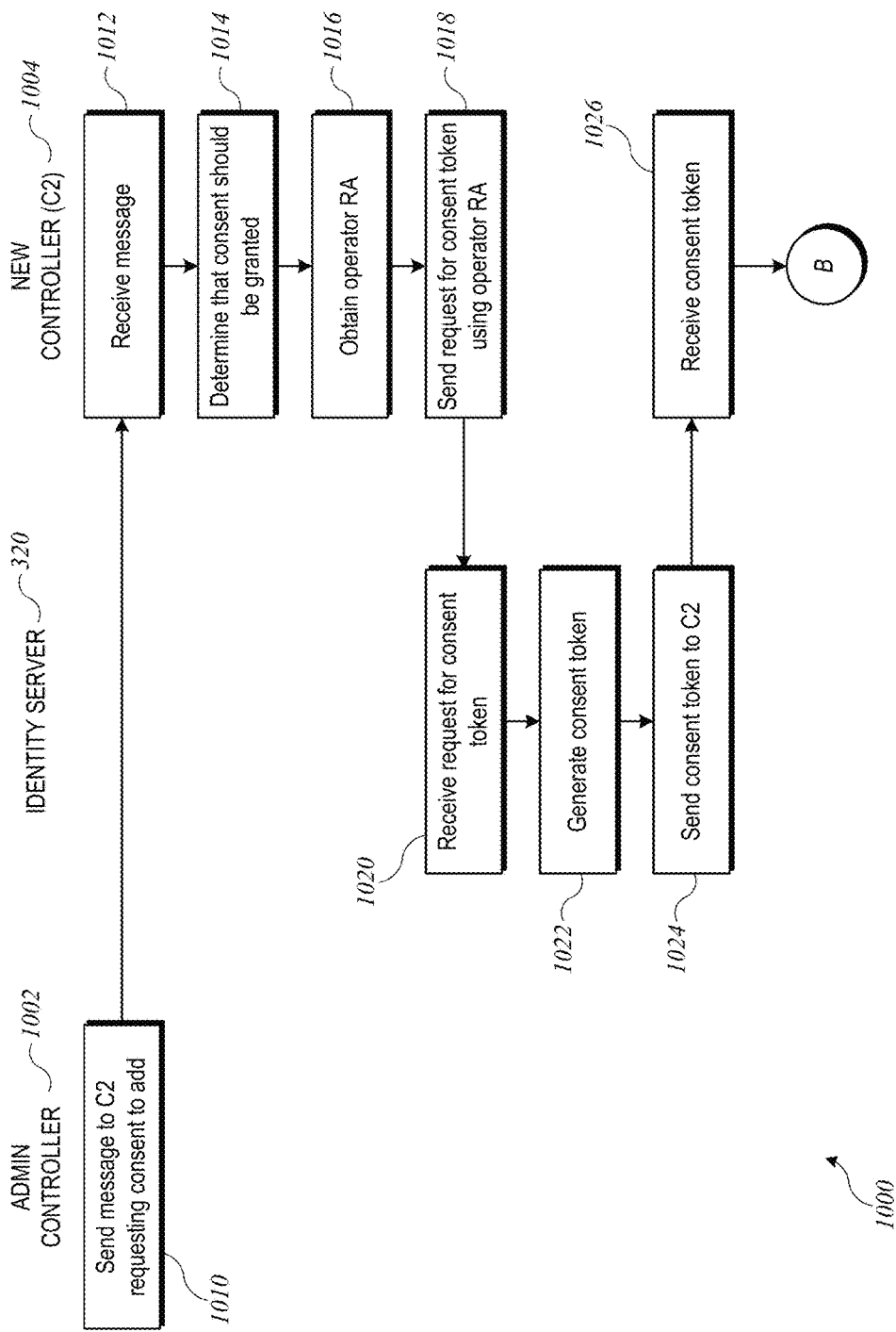
FIGS. 10A and 10B show a simplified flow diagram of a process for adding a relay pairing for another user according to an embodiment of the present invention.
Figure 10B:
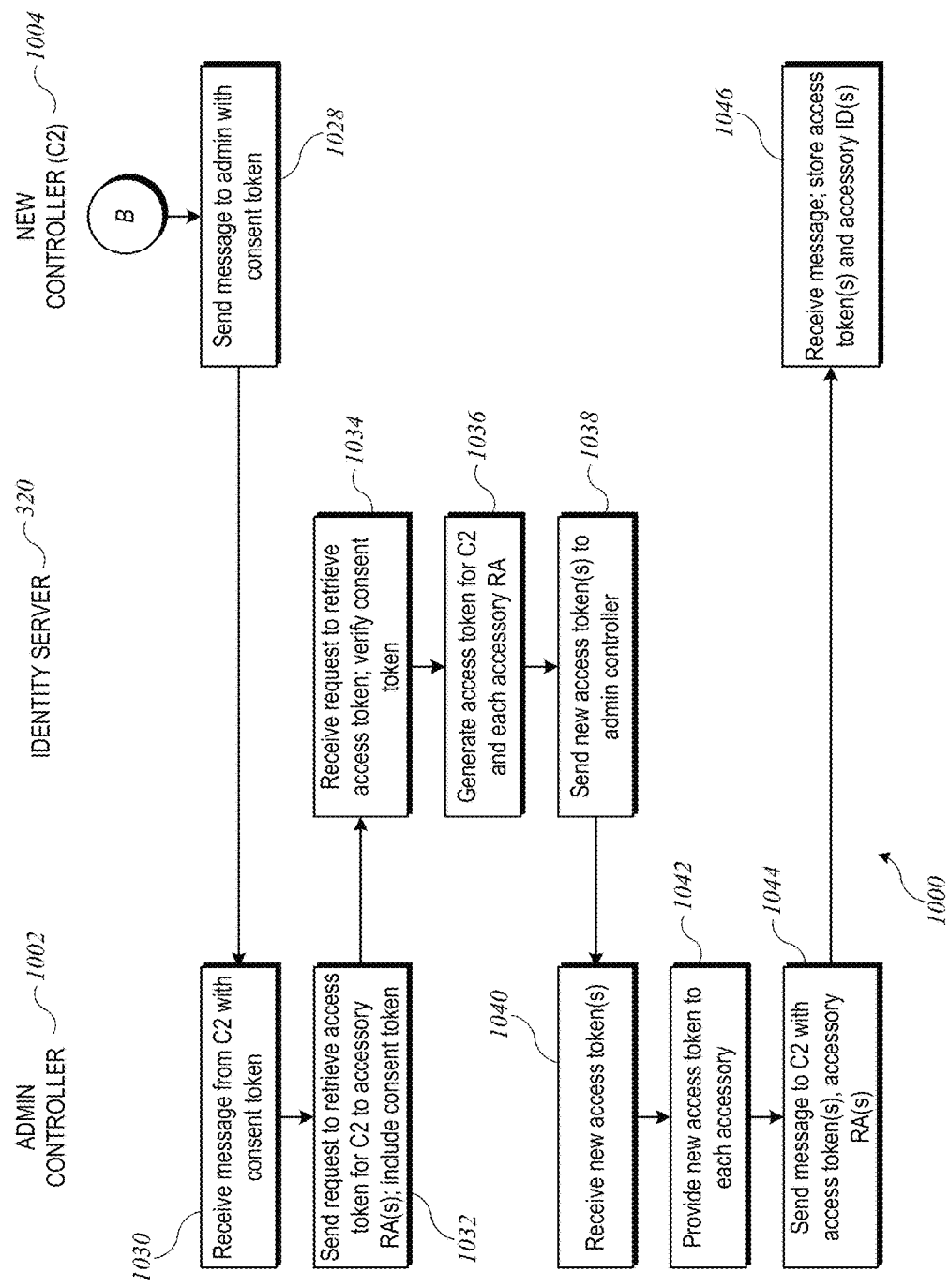

FIGS. 10A and 10B show a simplified flow diagram of a process 1000 for adding a relay pairing for a user according to an embodiment of the present invention. Process 1000 can be implemented, e.g., in "admin" controller 1002 (e.g., a controller such as controller 302 described above that has established a relay pairing with at least one accessory using the processes of FIGS. 4-7) interacting with identity server 320 and with a "new" controller 1004, which can be a controller belonging to a different user from the user of admin controller 1002. In this example, it is assumed that controller courier server 340 implements a controller-to-controller messaging service (e.g., similar to the iMessage® service of Apple Inc.) and that admin controller 1002 and new controller 1004 can communicate via controller courier service 340. Other implementations are possible, provided that some communication channel exists between admin controller 1002 and new controller 1004.

Referring first to FIG. 10A, process 1000 can begin when admin controller 1002 determines that a relay pairing of new controller 1004 with one or more accessories should be added. In this case, admin controller 1002 already has a relay pairing with each accessory in question. For example, admin controller 1002 may be used to manage accessories in a home, and new controller 1004 may belong to a user (e.g., roommate) who is moving into the home or who has not yet been added as an operator on relay service 300. In some embodiments, a user interface of admin controller 1002 may allow the admin user to identify the user to be added. Users can be identified in this context, e.g., by reference to a phone number, email address, or other item of information that can link them to one or more controller devices and/or to a user account with relay service 300. In some embodiments, the admin controller's user interface may allow the admin user to select a user to be added from a contacts list in which personal information of various individuals known to the admin user is stored. Other implementations are possible.

At block 1010, admin controller 1002 can send a message to new controller 1004 (also denoted "C2") requesting consent to add the user of new controller 1004 as an operator on relay service 300. The message can include a list of accessory RAs for the accessories for which a relay pairing is proposed to be established (which can include any or all accessories with which admin controller 1002 has a relay pairing), the operator RA of admin controller 1002 and an invitation code (which can be a code number recognizable to admin controller 1002 that can be used for bookkeeping related to consent requests). As noted above, controller-to-controller messaging via controller courier server 340 can be used. At block 1012, new controller 1004 can receive the message.

At block 1014, new controller 1004 can determine whether consent should be granted. For example, new controller 1004 can prompt its user for confirmation. Other techniques can also be used. In some embodiments, if new controller 1004 determines that consent should not be granted, process 1000 can end.

Assuming consent should be granted, at block 1016, new controller 1004 can obtain an operator RA for accessing relay service 300. New controller 1004 can obtain an operator RA in the same manner as described above for controller 302, e.g., by executing process 500. At block 1018, new controller 1004 can send a request for a consent token to identity server 320. The request can include, e.g., the operator RA of new controller 1004, other information usable to verify the identity of new controller 1004 with certificate server 310 (or another certificate server, such as a server dedicated to verifying identity of controllers), the operator RA of admin controller 1002, the list of accessory RAs received from admin controller 1002, and (if desired) an expiration time.

At block 1020, identity server 320 can receive the request for a consent token. At block 1022, identity server 320 can generate a set of consent tokens, one for each accessory RA. The consent token for a given accessory RA can include, e.g., the accessory RA, the operator RA of admin controller 1002, the operator RA of new controller 1004, a timestamp indicating when the consent token was generated, and an expiration time (which can be, e.g., 1 day, 7 days, or the like after the generation time; an expiration time specified in the request at block 1018 can be used). At block 1022, identity server 320 can send the consent token(s) to new controller 1004; each consent token can be associated with the corresponding accessory RA. Similarly to the temporary pairing token described above, identity server 320 can store a temporary token record for each consent token. At block 1026, new controller 1004 can receive the consent token(s).

As shown in FIG. 10B, having received the consent tokens, at block 1028, new controller 1004 can send a message to admin controller 1002, responsive to the request for consent. The message can include the consent token(s) received from identity server 320 at block 1026, with each consent token being associated with the corresponding accessory RA, as well as the invitation code that was included in the message from admin controller 1002 at block 1010. As noted above, controller-to-controller messaging via controller courier server 340 can be used. At block 1030, admin controller 1002 can receive the message.

At block 1032, admin controller 1002 can send a request to identity server 320 to retrieve an access token for a relay pairing between new controller 1004 and each accessory RA for which a consent token was received. The request can include, e.g., the accessory RA(s), the consent token corresponding to each accessory RA, the operator RA of admin controller 1002, and the access token for the already-established relay pairing between admin controller 1002 and one or more of the accessory RAs. Other information can also be included, such as information usable to verify the identity of new controller 1004 with certificate server 310

(or another certificate server, such as a server dedicated to verifying identity of controllers), an identifier of the new user (e.g., an email address or account identifier), etc.

At block 1034, identity server 320 can receive the request from admin controller 1002. At block 1036, identity server 320 can generate one or more access tokens for new controller 1004 based on the request. In some embodiments, processing at block 1036 can include verifying the identity of admin controller 1002 and/or verifying that the information included in the request matches the consent token that was temporarily stored. Assuming all verifications succeed, interaction server 320 can generate an access token for the operator RA of new controller 1004 and each accessory RA. Each access token can have the same structure as the access token generated at block 718 of process 700 described above. In some embodiments, access tokens established using a consent token can have the admin flag set to false. In other embodiments, the request from admin controller 1002 sent at block 1032 can specify whether the admin flag should be true or false for a particular new controller's operator RA. At block 1038, interaction server 320 can send the new access token(s) to admin controller 1002. Each access token can be associated with the accessory RA for which it is valid.

At block 1040, admin controller 1002 can receive the access token(s). At block 1042, admin controller 1002 can provide the new access token and the operator RA of new controller 1004 to each accessory, based on the accessory RAs. In some embodiments, new access tokens can be provided using messages conforming to the uniform accessory protocol, e.g., by writing to an appropriate characteristic of the accessory's remote relay access service. The messages can be communicated using a local channel and/or relay service 300 (e.g., depending on where admin controller 1002 is located at the relevant time).

At block 1044, admin controller 1002 can send a message to new controller 1004 that includes new pairing token associated with each accessory RA. At block 1046, new controller 1004 can receive the message from admin controller 1002 and can persistently store the accessory RAs in association with the access tokens. In some embodiments, the message at block 1044 is not sent until after the accessories have received the new pairing token, used the new pairing token to establish a new connection with accessory courier server 340 for communicating with new controller 1004, and confirmed the connection to admin controller 1002. This allows new controller 1004 to begin interacting with accessories via relay service 300 immediately after receipt of the message at block 1046.

It will be appreciated that process 1000 is illustrative and that variations and modifications are possible. Steps described as sequential may be executed in parallel, order of steps may be varied, and steps may be modified, combined, added or omitted. In this example, new controller 1004 might or might not have a local pairing established with a given accessory when process 1000 is performed, and new controller 1004 might or might not be able to determine that a given accessory RA and relay pairing token correspond to a particular local pairing. In some implementations, admin controller 1002 can provide correspondence information to new accessory 1004 to facilitate identifying a relay-paired accessory and a local-paired accessory as being the same accessory. For example, as described above, admin controller 1002 can maintain an environment model for an environment where the accessories are located. The environment model can associate local accessory identifiers with corresponding accessory RAs. The environment model can be synchronized to new controller 1004, e.g., as described in above-referenced U.S. application Ser. No. 14/725,912. In some embodiments, new controller 1004 can infer correspondences based on its communications with various accessories. Similarly the accessories with which new controller 1004 obtains a relay pairing via process 1000 might or might associate the relay pairing with a local pairing to the same controller. For example, admin controller 1002 can provide the corresponding local controller ID to the accessories along with the operator RA.

In some embodiments, a controller with admin privileges may be able to remove an established relay pairing for another controller. For example, new controller 1004 of FIG. 10 can send a message to admin controller 1002 requesting to have its relay pairings removed, or admin controller 1002 can determine that new controller 1004 should have its relay pairings removed (e.g., based on input from the admin user).

Figure 11:
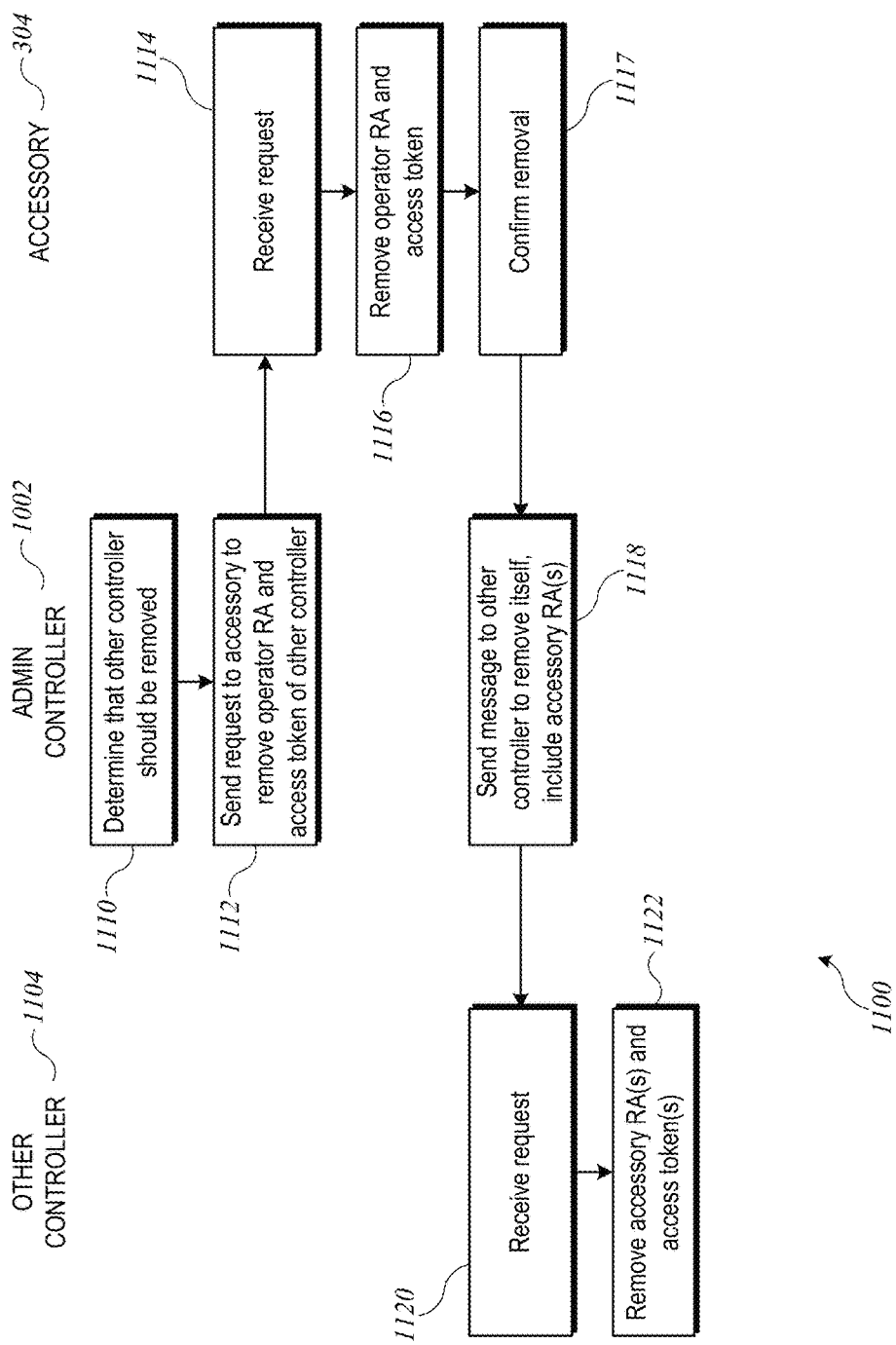
FIG. 11 shows a simplified flow diagram of a process for removing a relay pairing according to an embodiment of the present invention.

FIG. 11 shows a simplified flow diagram of a process 1100 for removing a relay pairing according to an embodiment of the present invention. Process 1100 can be implemented, e.g., by admin controller 1002 (as described above with reference to FIG. 10) communicating with an accessory 304 (or separately with each of multiple accessories, not shown) and with another controller 1104 that is to be removed. In some embodiments, controller 1104 can be a controller that was added as new controller 1004 using process 1000. Communication between admin controller 1002 and other controller 1104 can use controller-to-controller messaging via controller courier server 340 as described above; communication between admin controller 1002 and accessory 304 can use either a local channel or relay service 300 (e.g., depending on where admin controller 1002 is located at the relevant time).

Process 1100 can begin at block 1110, when admin controller 1002 determines that a relay pairing of other controller 1104 with accessory 304 should be removed. This can be part of removing all access rights to accessory 304 (and other accessories in a given environment) from other controller 1002, or the decision to remove can be more selective (e.g., per accessory). In some embodiments, a relay pairing can be removed without also removing a local pairing; in other embodiments, removing one type of pairing can result in removing both. In some embodiments, other controller 1104 can send a message to admin controller 1002 requesting removal. In other embodiments, admin controller can receive an instruction via a user interface to remove another user (or specific controller). Other determination logic can also be used.

At block 1112, admin controller 1002 can send a request to accessory 304 to remove other controller 1104. The request can be implemented, e.g., as a write request to an appropriate characteristic of the remote relay access service of accessory 304. The request can include the operator RA of other controller 1104. The request can be sent via a local channel or via relay service 300, depending on available communication channels at a given time.

At block 1114, accessory 304 can receive the request. At block 1116, accessory 304 can remove the operator RA and associated access token for other controller 1104 from its list of established relay pairings. Thereafter, accessory 304 does not attempt to communicate with controller 1104 via relay service 300. In some embodiments, a local pairing with other controller 1104 may remain until it is removed via a separate request. In other embodiments, a request to remove a relay pairing with a particular controller can also result in removing a local pairing associated with the same controller. For example, admin controller 1002 can also issue a request to accessory 304 to remove the local pairing with other controller 1004 as part of process 1100. At block 1117, accessory 304 can send a response to admin controller 1002 confirming the removal. In some embodiments, if admin controller 1002 does not receive a response, admin controller 1002 can initiate a different action to remove the relay pairing (e.g., resetting the accessory or prompting the user to reset the accessory).

At block 1118, admin controller 1002 can send a message to other controller 1104 instructing controller 1104 to remove its relay pairing(s). The message can include a list of accessory RAs for which relay pairings are to be removed. In some embodiments, accessories for which relay pairings are to be removed can be identified as a group. For instance, if the accessory RAs are associated with an environment model of the local environment in which the accessories physically reside, the environment model can have an identifier, and admin controller 1002 can instruct other controller 1104 to remove the relay pairings for all accessory RAs associated with the environment model. As noted above, controller-to-controller messaging via controller courier server 340 can be used.

At block 1120, other controller 1104 can receive the message. At block 1122, other controller 1104 can remove the accessory RAs and associated access tokens as instructed. The removal process can result in removing any information about the accessories from other controller 1104 (including, in some embodiments, local pairings). In some embodiments, blocks 1120 and 1122 can be implemented within a communication daemon in controller 1104 so that they occur automatically (and optionally transparently to a user) on receipt of the message at block 1120. If process 1100 was initiated based on a message from other controller 1104 requesting removal, blocks 1118 and 1120 can be omitted, and controller 1104 can remove the accessory RAs on its own initiative.

It will be appreciated that process 1100 is illustrative and that variations and modifications are possible. Steps described as sequential may be executed in parallel, order of steps may be varied, and steps may be modified, combined, added or omitted. In this example, neither controller notifies identity server 320 of the removal. Since the access tokens are removed at the endpoints, the continued presence of a record for the access token in repository 322 of identity server 320 does not enable any communication between controller 1104 and accessory 304 after process 1100 has executed. In some embodiments, admin controller 1002 can send a cleanup request to identity server 320 to revoke the token record for the access token, e.g., by removing the token record from token repository 322. In some embodiments, token records can expire from repository 322, e.g., based on an expiration timestamp included in the access token as described above, and identity server 320 can periodically remove records where the access token has expired. Other processes can also be used.

Pass Server Example

As described above, relay service 300 can know that communication is occurring between controllers and accessories but may not know the content of such communication. Relay service 300 can also have some information as to the volume of traffic associated with particular accessory RAs or types of accessories, e.g., by implementing a reporting service as described below. In some embodiments, relay service 300 can block accessories that are known or suspected to generate excessive traffic (or to exhibit other anomalous or undesirable behavior in relation to relay service 300) from connecting to accessory courier server 330. This can be done without relay service 300 storing information associating an accessory RA with an accessory type or other accessory-identifying information.

In some embodiments, pass server 360 can be used for blocking accessories associated with anomalous behavior. For example, when accessory 304 requests a connection to accessory courier server 330, accessory courier server 330 can require accessory 304 to present a valid pass. Accessory 304 can obtain a pass from pass server 360 and present the pass to accessory courier server 330.

Figure 12:
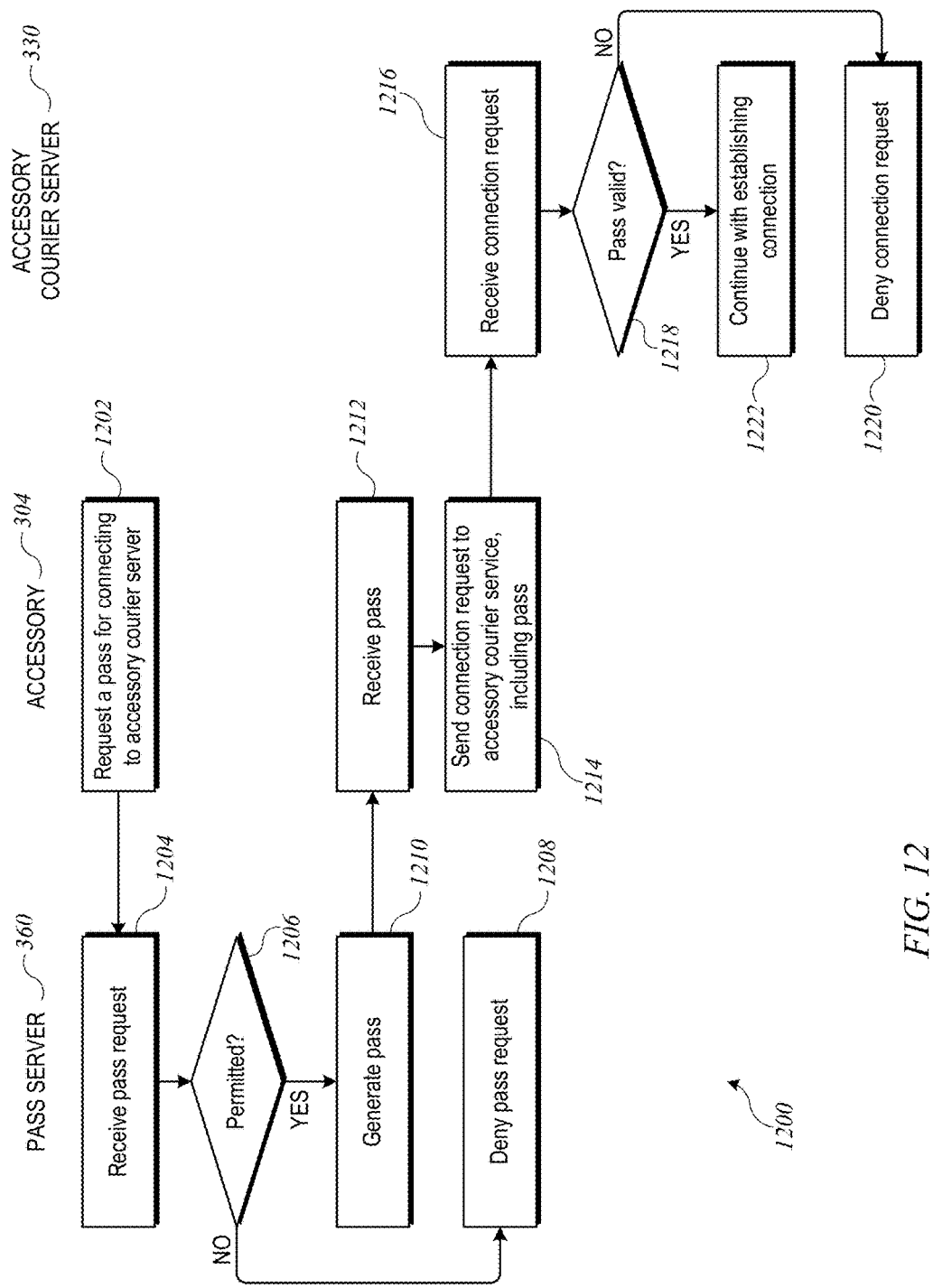
FIG. 12 shows a simplified flow diagram of a process for establishing a connection between an accessory and an accessory courier server according to an embodiment of the present invention.

FIG. 12 shows a simplified flow diagram of a process 1200 for establishing a connection between an accessory (e.g., accessory 304) and an accessory courier server (e.g., accessory courier server 330) according to an embodiment of the present invention. Portions of process 1200 can be performed by accessory 304 interacting with pass server 360, and portions of process 1200 can be performed by accessory 304 interacting with accessory courier server 330.

Process 1200 can begin at any time when accessory 304 determines that a connection to accessory courier server 330 should be established. At block 1202, accessory 304 can send a request for a pass to pass server 360. The request can include accessory-identifying information for accessory 304, such as manufacturer, model, firmware version, etc. In this example, the pass request does not include the accessory RA or any operator RA.

At block 1204, pass server 360 can receive the request, and at block 1206, pass server 360 can determine whether access by accessory 304 is permitted. For example, pass server 360 can determine whether the accessory identifying information corresponds to an entry in blacklist 362 (creation and updating of blacklist 362 is described below). In some embodiments, access is permitted unless accessory 304 is on blacklist 362. Other decision criteria can also be supported. If, at block, 1206, it is determined that access is not permitted, the request can be denied at block 1208, and process 1200 can end.

If, at block 1206, it is determined that access is permitted, then at block 1210, pass server 360 can generate a pass. The pass can include a timestamp when the pass was generated, a code (e.g., a digital signature) generated by the pass server, and/or other data as desired. In some embodiments, the pass does not contain any information specific to accessory 304 or to a particular transaction with pass server 360. For example, the pass generation process can be implemented such that all passes generated within a particular time period (e.g., 5-minute granularity) are identical, so that a pass cannot be linked by relay service 300 to a specific transaction at pass server 360.

At block 1212, accessory 304 can receive the pass from pass server 360. At block 1214, accessory 304 can send a connection request to accessory courier server 330. The connection request can include the accessory RA for accessory 304 and an access token and operator RA for each controller with which accessory 304 intends to be able to exchange messages using relay service 300. The connection request can also include the pass received from pass server 360.

At block 1216, accessory courier service 330 can receive the connection request from accessory 304. At block 1218, accessory courier service 330 can determine whether the pass included in the request is valid. For instance, accessory courier service 330 may send the pass to pass server 360 for validation, or accessory courier service 330 may receive information from pass server 360 that is usable to validate the pass (e.g., a list of timestamps and associated codes). If, at block 1218, the pass is not valid, accessory courier server 330 can deny the request at block 1220, and process 1200 can end.

If, at block 1218, the pass is valid, then at block 1222, accessory courier server 330 can continue with establishing the connection. For example, accessory 304 may be required to authenticate using its PKI certificate and UUID as described above, and access tokens presented by accessory 304 in the connection request can be validated by accessory courier server 330. Assuming such operations are successfully completed, the connection can be established.

It will be appreciated that process 1200 is illustrative and that variations and modifications are possible. Steps described as sequential may be executed in parallel, order of steps may be varied, and steps may be modified, combined, added or omitted. In some embodiments, necessary courier server 340 can require an accessory that remains connected to renew its pass periodically, e.g., by sending a request for a new pass to an accessory via the open connection. The renewal period can be, e.g., every 24 or 48 hours. Use of pass server 360 can allow accessories whose presence may impair the functioning of relay service 300 (e.g., by generating excessive traffic) to be excluded while avoiding the need to have relay service 300 retain accessory identifying information (e.g., manufacturer, model, etc.) for specific accessories. For example, pass server 360 can discard any accessory-identifying information it receives immediately upon generating a pass (or denying a pass request). Pass server 360 in this example does not receive the accessory RA, so the accessory RA does not become associated (even temporarily) with any accessory-identifying information provided in the pass request. Further, pass server 360 can generate passes in a manner that a pass is not connected with a specific transaction (e.g., multiple accessories can receive the same pass), so relay server 330 cannot tie a particular connection to accessory courier server 330 to a specific accessory or accessory type. This can facilitate protection of user privacy.

Reporting Example

In some embodiments, pass server 360 can use blacklist 362 to make decisions regarding whether to issue a pass in response to a pass request from an accessory. Blacklist 362 can be populated dynamically based on anomalous activity detected at relay service 300. As used herein, "anomalous activity" by an accessory can include any sort of unusual or unexpected activity that may have an adverse effect on operation of relay service 300. For example, a particular accessory or many accessories of similar type may begin sending state-change notifications at an unusually high rate, or an accessory connection may become unstable, resulting in a high rate of disconnect-and-reconnect events at accessory courier server 330. Such events may be the result of firmware changes that contain bugs or other issues that may arise in a particular implementation of an accessory.

As described above, some embodiments of relay service 300 avoid retaining information usable by third parties to identify a particular accessory as being of a particular type. For instance, as described above, the accessory RA can be decoupled from such accessory-identifying information as manufacturer, model accessory location, etc. In one specific example, certificate server 310 may receive a digital security certificate from an accessory, and the certificate may be connected with a particular manufacturer, model, or class of accessories. Thus, it is possible that the digital security certificate might reveal information about the accessory's identity and/or functionality. However, as described above, certificate server 310 can validate the digital security certificate, then generate a PKI certificate and device identity token (e.g., UUID) that need not be correlated in any way with information in the digital security certificate, or any correlation can be encoded in such a way that only certificate server 310 can decipher it. Certificate server 310 can retain just the PKI certificate and UUID for future authentication operations. Subsequently, the accessory can use the PKI certificate and UUID to obtain an accessory RA from accessory courier server 330. The accessory RA can be randomly or pseudorandomly assigned and can be uncorrelated with the PKI certificate and associated UUID. As a result, the accessory's identity and/or functionality can be dissociated from the identification of the accessory within relay service 300, in such a way that third parties cannot infer accessory identity or functionality based on message exchanged with relay service 300.

Despite these privacy protections, it may be desirable to provide some diagnostic ability to trace anomalous accessory behavior to a source (e.g., a specific type of accessory). In some embodiments, reporting server 370 of FIG. 3 can support a diagnostic process.

Figure 13:
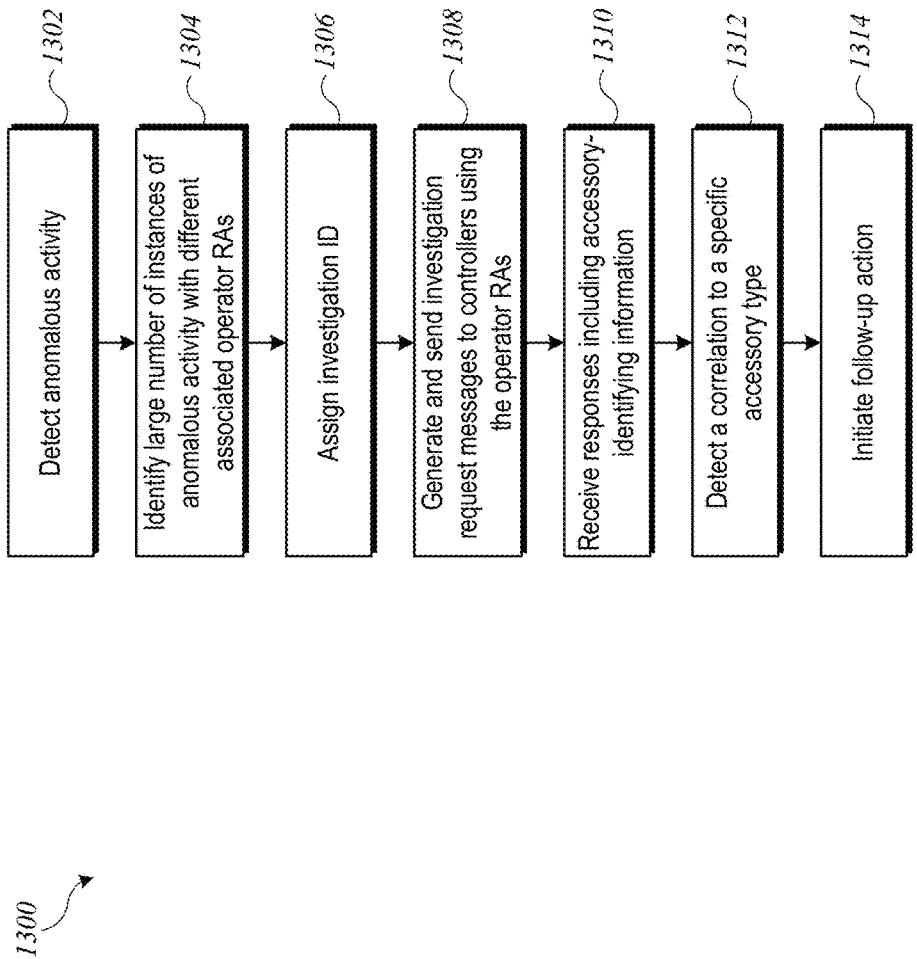
FIG. 13 shows a simplified flow diagram of a diagnostic process according to an embodiment of the present invention.

FIG. 13 shows a simplified flow diagram of a diagnostic process 1300 according to an embodiment of the present invention. Portions of process 1300 can be implemented, e.g., in reporting server 370.

At block 1302, process 1300 can detect anomalous activity. In some embodiments, anomalous activity can be detected based on analysis of relay service logs. The logs can record, for instance, when relay messages were sent, the operator RA and accessory RA, direction of the relay message, and message size. Other events, such as when an accessory RA connected to accessory courier server 330 or disconnected from accessory courier server 330, or unsuccessful connection attempts, can also be logged. The logs need not record message content, access tokens, or any other information. Analysis at block 1302 can include applying statistical algorithms to define a baseline pattern of accessory behavior, and accessory RAs that begin to deviate significantly from the baseline can be identified as having anomalous activity. Other sources of information can also be used to detect anomalies, such as performance metrics associated with various servers in relay service 300, network traffic patterns, and so on. Analysis at block 1302 can be performed, e.g., using automated processes implemented in reporting server 370 and/or human analysts.

At block 1304, a pattern of anomalous activity involving a large number of accessories associated with different operator RAs can be identified. A "large" number in this context can be defined, e.g., as enough accessories that at least 100 different operator RAs are associated with the accessory RAs. The exact threshold for a "large" number can be selected based on the goal of identifying relatively widespread anomalies and also preserving user privacy throughout the diagnostic process (e.g., as described below). Detection of anomalous patterns can be based on automated processes implemented in reporting server 370. In some embodiments, human reviewers may be involved in detecting and/or confirming anomalous patterns. If no anomalous patterns are detected, or if an anomalous pattern involving less than the threshold number of operator RAs is detected, then no further investigation is performed.

Assuming further investigation is to be performed, at block 1306, an investigation ID can be assigned to the identified pattern of anomalous activity. The investigation ID can be a sequentially or randomly assigned number or the like. As described below, the investigation ID is used to gather responses to requests for information associated with the investigation. In some embodiments, reporting server 370 can assign the investigation ID.

At block 1308, investigation request messages can be generated and sent to the operator RAs associated with the anomalous activity. As noted above, in some embodiments, an investigation is only initiated if the number of operator RAs exceeds a threshold for being considered large (e.g., 100 or more). The investigation request messages can be sent using controller courier server 340. The investigation request message can include a request for accessory identifying information for the accessory RA involved in the anomalous pattern. The investigation message can also include the investigation ID. At block 1310, responses to the investigation request messages can be received. A specific example of sending investigation request messages and receiving responses is described below.

In some embodiments, the responses received at block 1310 can include just the investigation ID and accessory-identifying information (e.g., manufacture and model, firmware version, etc.). The accessory RA and/or operator RA need not be included, so that reporting server 370 does not associate the accessory-identifying information with the accessory RA or the operator RA. Instead, the accessory-identifying information is associated only with the investigation ID.

At block 1312, reporting server 370 (or a human reviewer) can analyze the responses associated with a particular investigation ID to attempt to trace the anomalous activity to a specific accessory type (e.g., a particular model of garage door opener or an accessory running a particular firmware version).

At block 1314, follow-up action can be initiated based on the results of the analysis at block 1312. Depending on incident-specific details, such as severity of the anomaly, strength of the correlation to a particular accessory type, etc., various specific follow-up actions can be taken. For example, the accessory type can be added to blacklist 362. In addition or instead, a manufacturer of the accessory to which anomalous activity is traced can be notified, which can allow the manufacturer to investigate and address the problem (e.g., with a firmware upgrade).

Figure 14:
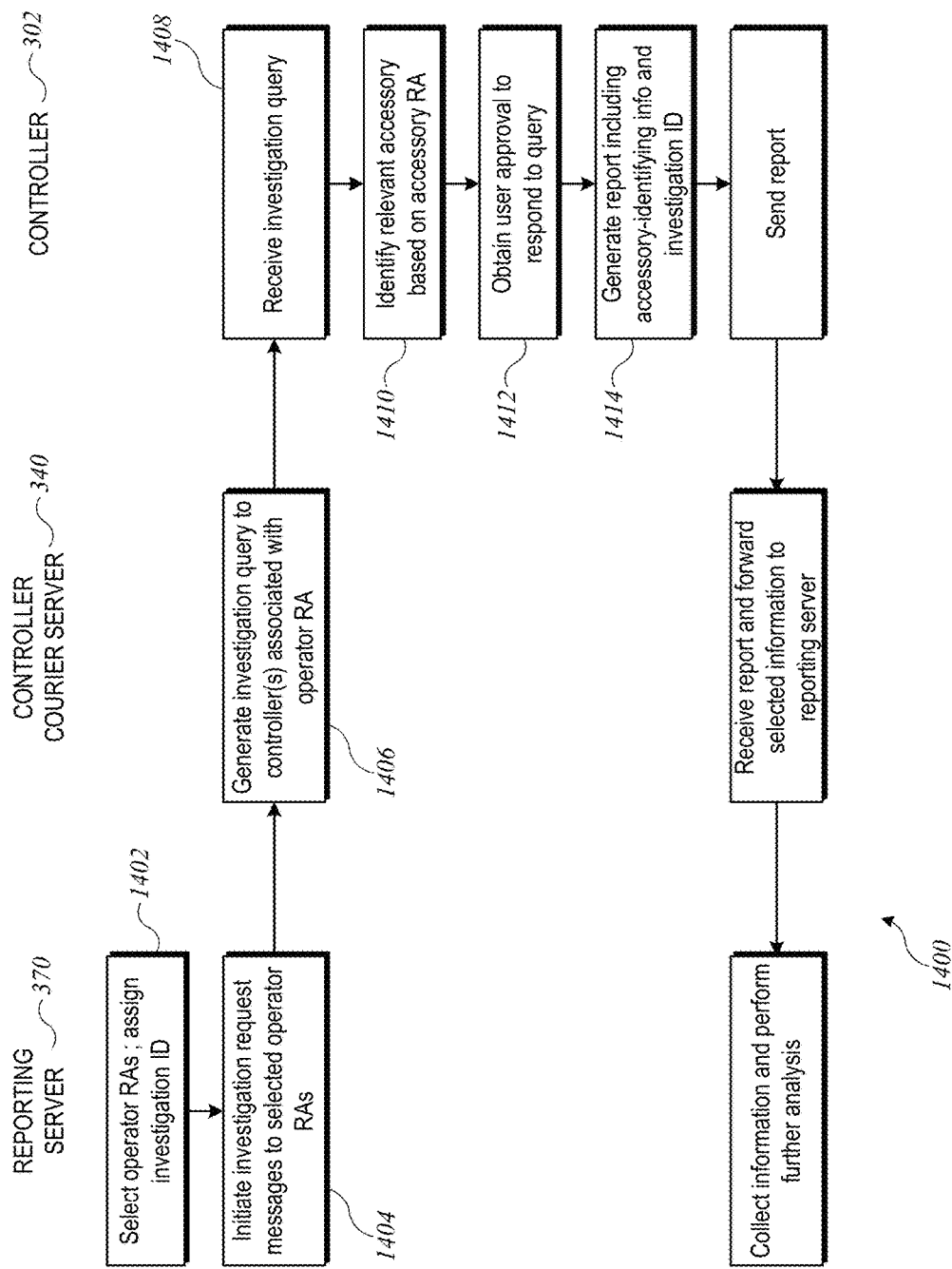
FIG. 14 shows a simplified flow diagram of an investigation process according to an embodiment of the present invention.

FIG. 14 shows a simplified flow diagram of an investigation process 1400 according to an embodiment of the present invention. Process 1400, which can be used in conjunction with process 1300, can include generating investigation request messages to controllers and receiving responses.

Process 1400 can begin at block 1402, when reporting server 370 determines that investigation is appropriate, e.g., as a result of executing block 1304 of process 1300 described above. At block 1402, reporting server 370 can select a set of operator RAs to receive investigation request messages and can assign an investigation ID to the investigation. The set of operator RAs can be a large set (e.g., at least 100 different operator RAs as described above). In some embodiments, all operator RAs that are associated with a pattern of anomalous activity can be selected; alternatively, a subset of operator RAs can be randomly selected. At block 1404, reporting server 370 can initiate investigation request messages to the selected operator RAs. For instance, reporting server 370 can generate a request message to each operator RA, including the investigation ID and a list of one or more accessory RAs associated with both the operator RA and the anomalous activity. Reporting server 370 can provide the request message to controller courier server 340.

At block 1406, controller courier server 340 can receive the investigation request message for a particular operator RA from reporting server 370. Controller courier server 340 can generate an investigation query to one or more controllers (e.g., controller 302) associated with each operator RA. The investigation query to controller 302 can include the investigation ID and the list of accessory RAs that are associated with the operator RA of controller 302 and the anomalous activity. Controller courier server 340 can send the investigation query to controller 302.

At block 1408, controller 302 can receive the investigation query. At block 1410, controller 302 can identify the relevant accessory based on the received accessory RA. For example, as described above controller 302 may store an accessory model or environment model that associates the accessory RA assigned by relay service 300 with a model of a specific accessory's capabilities and functions; the accessory model or environment model can include accessory-identifying information such as manufacturer, model, serial number, firmware version, etc. At block 1410, controller 302 can access the stored information for the accessory associated with the accessory RA and retrieve accessory-identifying information.

At block 1412, controller 302 can obtain user approval to respond to the investigation query. For example, controller 302 can present a prompt to the user. The prompt can indicate that relay service 300 is investigating anomalous activity and would like to receive information about an accessory (or multiple accessories) associated with the anomalous activity. The prompt can identify the accessory in question (e.g., based on the determination at block 1410). If the user declines, process 1400 can end without sending a report back to reporting server 370. In some embodiments, controller 302 can simply not respond to the investigation query if the user declines.

Assuming the user approves, at block 1414, controller 302 can generate a report message responsive to the investigation query. The report message can include some or all of the accessory-identifying information retrieved at block 1410 as well as the investigation ID that was included in the investigation query. The report message does not need to include the accessory RA or operator RA. At block 1416, controller 302 can send the report message to controller courier server 340.

At block 1418, controller courier server 340 can receive the report message from controller 302 and can forward selected information from the report message to reporting server 370. For example, controller courier server 340 can forward the investigation ID and the accessory-identifying information but not any information identifying the controller or operator.

At block 1420, reporting server 370 can collect the information forwarded by controller courier server 340 and can perform further analysis and operations, e.g., in accordance with blocks 1310, 1312, 1314 of process 1300. It should be noted that, via process 1400, reporting server 370 need not obtain any information associating specific accessories with specific accessory RAs or with specific controllers or operator RAs. Instead, based on the information forwarded by controller courier server 340, reporting server 370 can assemble a list of accessory-identifying information for accessories associated with the anomalous activity (based on the investigation ID), without being able to associate a particular item of accessory-identifying information with any controller or operator. The fact that reporting server 370 only initiates an investigation if a large number of operator RAs are involved can help to prevent reporting server 370 from associating the received information with any specific operator RA from the original set of requests at block 1404. In fact, reporting server 370 need not know which operator RAs responded or not.

It will be appreciated that processes 1300 and 1400 are illustrative and that variations and modifications are possible. Steps described as sequential may be executed in parallel, order of steps may be varied, and steps may be modified, combined, added or omitted. An investigation can be held open awaiting controller responses for as long as desired (e.g., a day, a week, ten days, a month), and the investigation ID can be used to track which investigations are still open. If a response to an investigation query is received after an investigation is closed, the response can be discarded based on the investigation ID. Thus, a controller need not determine whether an investigation is still open prior to sending a response. Further, the use of investigation IDs can allow multiple investigations of different anomalous patterns to be conducted concurrently. In some instances, an investigation need not lead to further action. For instance, reporting server 370 might not receive enough information to reliably trace the anomaly to a specific type of accessory, or even a large amount of received information might not reveal a correlation with a specific type of accessory.

Example Device Architectures

Figure 15:
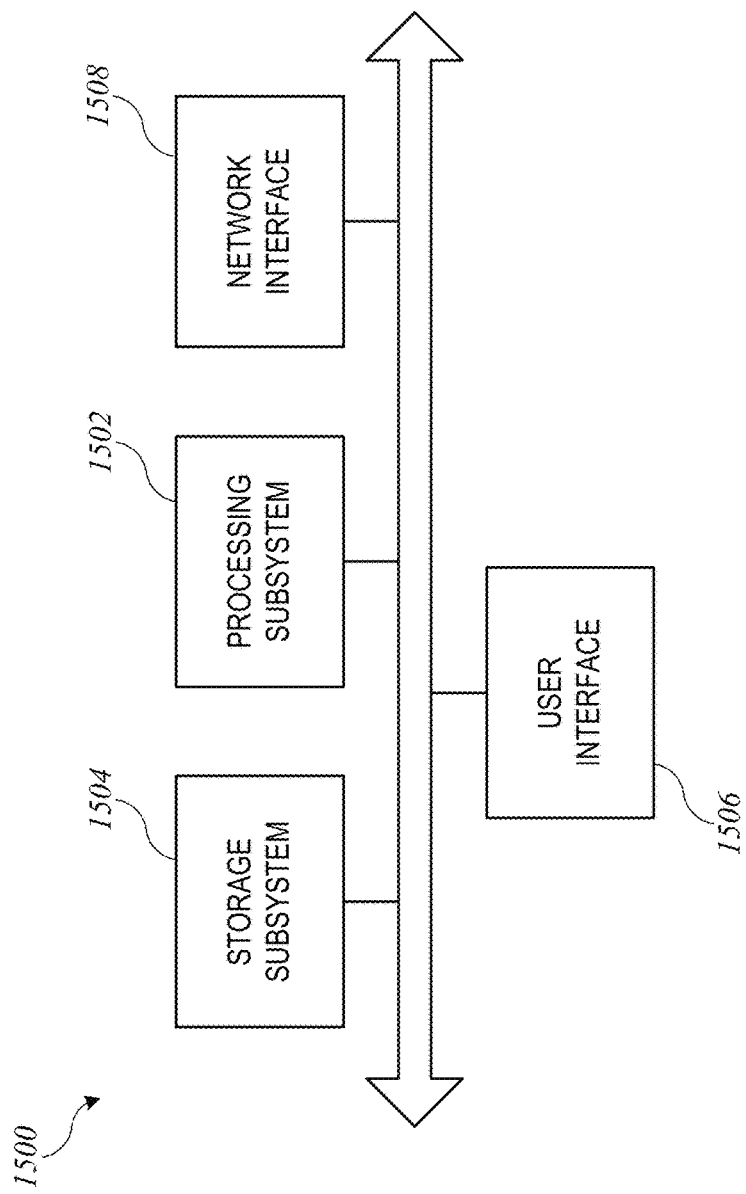
FIG. 15 shows a simplified block diagram of a computer system according to an embodiment of the present invention.

FIG. 15 shows a simplified block diagram of a computer system 1500 according to an embodiment of the present invention. In some embodiments, computer system 1500 can implement any or all of the functions, behaviors, and capabilities described herein as being performed by a server (e.g., any of the servers of relay service 300 of FIG. 3), as well as other functions, behaviors, and capabilities not expressly described. In some embodiments, other physical instances of computer system 1500 can implement any or all of the functions, behaviors, and capabilities described herein as being performed by a controller (e.g., controller 302 of FIG. 3) or an accessory (e.g., accessory 304 of FIG. 3); further examples of controller and accessory implementations are described below.

Computer system 1500 can include processing subsystem 1502, storage subsystem 1504, user interface 1506, and network interface 1508. Computer system 1500 can also include other components (not explicitly shown) such as a battery, power controllers, and other components operable to provide various enhanced capabilities. In some embodiments (e.g., for a controller), computer system 1500 can be implemented in a consumer electronic device such as a desktop or laptop computer, tablet computer, smart phone, other mobile phone, wearable device, media device. household appliance, or the like. Computer system 1500 can also be implemented (e.g., for relay service 300) in a large-scale architecture such as a scalable server system or server farm that can include many interconnected processors, storage systems and interfaces, capable of processing and responding to high volumes of requests from client devices including controllers and/or accessories.

Storage subsystem 1504 can be implemented, e.g., using disk, flash memory, or any other non-transitory storage medium, or a combination of media, and can include volatile and/or non-volatile storage media. In some embodiments, storage subsystem 1504 can store one or more application and/or operating system programs to be executed by processing subsystem 1502, including programs to implement any or all operations described herein as being performed by any or all of the servers of relay service 300 as well as data associated with such operations (e.g., token repository 322 and other stored data collections). In instances where computer system 1500 implements a server, storage subsystem 1504 can be implemented using network storage technologies and/or other technologies that can manage high-volume data access requests.

User interface 1506 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 1506 to invoke the functionality of computer system 1500 and can view and/or hear output from computer system 1500 via output devices of user interface 1506. In instances where computer system 1500 implements a server, user interface 1506 can be remotely located with respect to processing subsystem 1502 and/or storage subsystem 1504.

Processing subsystem 1502 can be implemented using one or more integrated circuits, e.g., one or more single-core or multi-core microprocessors or microcontrollers, examples of which are known in the art. In operation, processing subsystem 1502 can control the operation of computer system 1500. In various embodiments, processing subsystem 1502 can execute a variety of programs in response to program code and can maintain multiple concurrently executing programs or processes. At any given time, some or all of the program code to be executed can be resident in processing subsystem 1502 and/or in storage media such as storage subsystem 1504.

Through suitable programming, processing subsystem 1502 can provide various functionality for computer system 1500. For example, where computer system 1500 implements a server of relay service 300, processing subsystem 1502 can implement various processes (or portions thereof) described above as being implemented by any or all of certificate server 310, identity server 320, accessory courier server 330, controller courier serve 340, message passing server(s) 350, pass server 360, and/or reporting server 370. Processing subsystem 1502 can also execute other programs to control other functions of computer system 1500, including programs that may be stored in storage subsystem 1504.

Network communication interface 1508 can provide voice and/or data communication capability for computer system 1500. In some embodiments, network communication interface 1508 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 1508 can provide wired network connectivity (e.g., Ethernet) in addition to or instead of a wireless interface. Network communication interface 1508 can be implemented using a combination of hardware (e.g., driver circuits, antennas, modulators/demodulators, encoders/decoders, and other analog and/or digital signal processing circuits) and software components. In some embodiments, network communication interface 1508 can support multiple communication channels concurrently, using the same transport or different transports.

It will be appreciated that computer system 1500 is illustrative and that variations and modifications are possible. Computer systems including servers, controller devices, and/or accessories can have functionality not described herein (e.g., a controller device may also provide voice communication via cellular telephone networks; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Controllers and accessories described herein can be implemented in electronic devices that can be of generally conventional design. Such devices can be adapted to communicate using a uniform accessory protocol that supports command-and-control operations by which a controller (a first electronic device) can control operation of an accessory (a second electronic device). In some instances, a device can combine features or aspects of a controller and an accessory, e.g., in the case of a proxy as described above.

Figure 16:
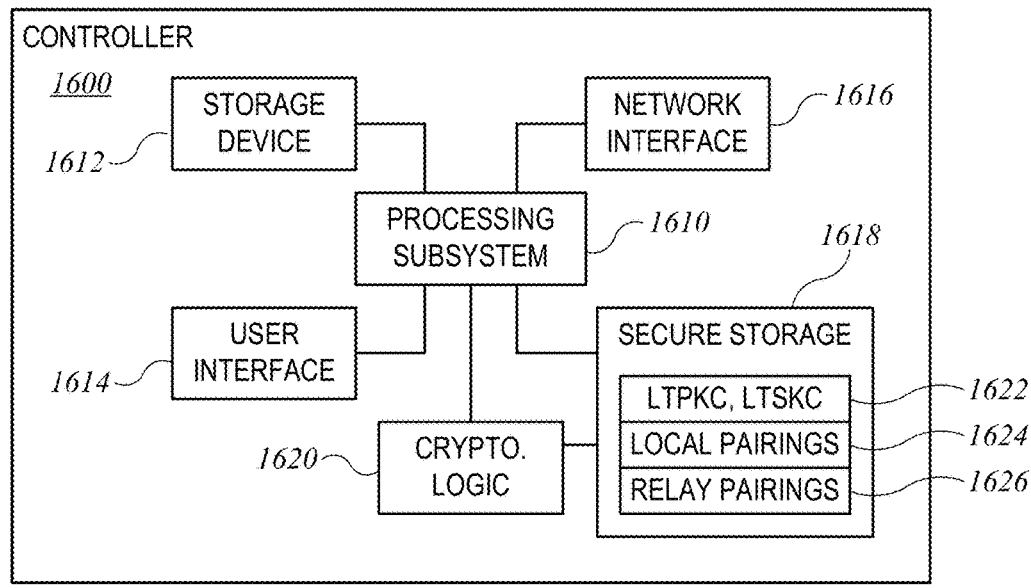
FIG. 16 shows a simplified block diagram of a controller according to an embodiment of the present invention.

FIG. 16 shows a simplified block diagram of a controller 1600 according to an embodiment of the present invention. Controller 1600 can implement any or all of the controller functions, behaviors, and capabilities described herein, as well as other functions, behaviors, and capabilities not expressly described. Controller 1600 can include processing subsystem 1610, storage device 1612, user interface 1614, communication interface 1616, secure storage module 1618, and cryptographic logic module 1620. Controller 1600 can also include other components (not explicitly shown) such as a battery, power controllers, and other components operable to provide various enhanced capabilities. In various embodiments, controller 1600 can be implemented in a desktop computer, laptop computer, tablet computer, smart phone, other mobile phone, wearable computing device, or other systems having any desired form factor. Further, as noted above, controller 1600 can be implemented partly in a base station and partly in a mobile unit that communicates with the base station and provides a user interface.

Storage device 1612 can be implemented, e.g., using disk, flash memory, or any other non-transitory storage medium, or a combination of media, and can include volatile and/or non-volatile media. In some embodiments, storage device 1612 can store one or more application and/or operating system programs to be executed by processing subsystem 1610, including programs to implement various operations described above as being performed by a controller. For example, storage device 1612 can store a uniform controller application that can read an accessory description record and generate a graphical user interface for controlling the accessory based on information therein (e.g., as described in above-referenced U.S. application Ser. No. 14/614,914). Storage device 1612 can also store program code executable to communicate with a relay service, e.g., as described above. In some embodiments, portions (or all) of the controller functionality described herein can be implemented in operating system programs rather than applications. In some embodiments, storage device 1612 can also store apps designed for specific accessories or specific categories of accessories (e.g., an IP camera app to manage an IP camera accessory or a security app to interact with door lock accessories).

User interface 1614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1614 to invoke the functionality of controller 1600 and can view and/or hear output from controller 1600 via output devices of user interface 1614.

Processing subsystem 1610 can be implemented as one or more integrated circuits, e.g., one or more single-core or multi-core microprocessors or microcontrollers, examples of which are known in the art. In operation, processing system 1610 can control the operation of controller 1600. In various embodiments, processing subsystem 1610 can execute a variety of programs in response to program code and can maintain multiple concurrently executing programs or processes. At any given time, some or all of the program code to be executed can be resident in processing subsystem 1610 and/or in storage media such as storage device 1612.

Through suitable programming, processing subsystem 1610 can provide various functionality for controller 1600. For example, in some embodiments, processing subsystem 1610 can implement various processes (or portions thereof) described above as being implemented by a controller. Processing subsystem 1610 can also execute other programs to control other functions of controller 1600, including application programs that may be stored in storage device 1612. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above, and can include communicating with the accessory via a relay service as described above.

Communication interface 1616 can provide voice and/or data communication capability for controller 1600. In some embodiments communication interface 1616 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1616 can provide wired network connectivity (e.g., Ethernet) in addition to or instead of a wireless interface. Communication interface 1616 can be implemented using a combination of hardware (e.g., driver circuits, antennas, modulators/demodulators, encoders/decoders, and other analog and/or digital signal processing circuits) and software components. In some embodiments, communication interface 1616 can support multiple communication channels concurrently or at different times, using the same transport or different transports. Thus, for example, controller 1600 can communicate with accessories via a local channel at some times and via a relay service at other times.

Secure storage module 1618 can be an integrated circuit or the like that can securely store cryptographic information for controller 1600. Examples of information that can be stored within secure storage module 1618 include the controller's long-term public and secret keys 1622 (LTPKC, LTSKC), a list of local pairings 1624 (e.g., a lookup table that maps a local accessory identifier to an accessory long-term public key (LTPKA) for accessories that have completed a local pair setup or pair add process, e.g., as described above, with controller 1600), and a list of relay pairings 1626 (e.g., accessory RAs and associated access tokens for accessories that have established a relay pairing, e.g., as described above, with controller 1600). In some embodiments, pairing information can be stored such that a local pairing 1624 is mapped to the corresponding relay pairing 1626 in instances where both a local pairing and a relay pairing with the accessory have been established.

In some embodiments, cryptographic operations can be implemented in a cryptographic logic module 1620 that communicates with secure storage module 1618. Physically, cryptographic logic module 1620 can be implemented in the same integrated circuit with secure storage module 1618 or a different integrated circuit (e.g., a processor in processing subsystem 1610) as desired. Cryptographic logic module 1620 can include various logic circuits (fixed or programmable as desired) that implement or support cryptographic operations of controller 1600, including any or all cryptographic operations described above. Secure storage module 1618 and/or cryptographic logic module 1620 can appear as a "black box" to the rest of controller 1600. Thus, for instance, communication interface 1616 can receive a message in encrypted form that it cannot decrypt and can simply deliver the message to processing subsystem 1610. Processing subsystem 1610 may also be unable to decrypt the message, but it can recognize the message as encrypted and deliver it to cryptographic logic module 1620. Cryptographic logic module 1620 can decrypt the message (e.g., using information extracted from secure storage module 1618) and determine what information to return to processing subsystem 1610. As a result, certain information can be available only within secure storage module 1618 and cryptographic logic module 1620. If secure storage module 1618 and cryptographic logic module 1620 are implemented on a single integrated circuit that executes code only from an internal secure repository, this can make extraction of the information extremely difficult, which can provide a high degree of security. Other implementations are also possible.

Figure 17:
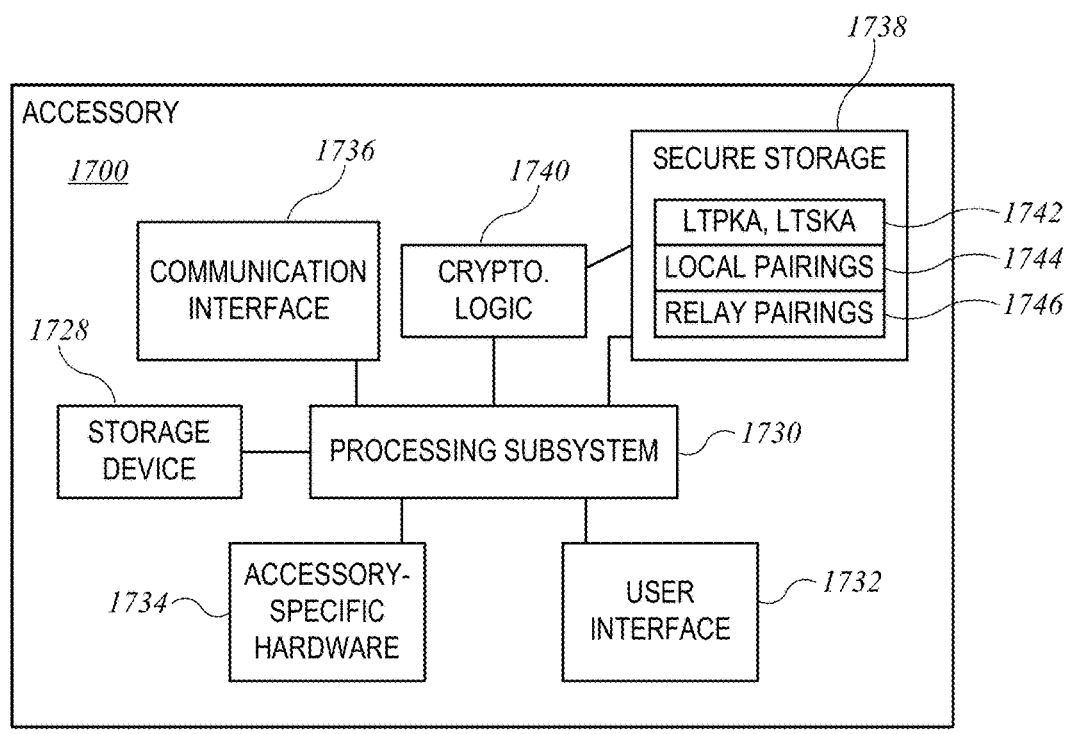
FIG. 17 shows a simplified block diagram of an accessory according to an embodiment of the present invention.

FIG. 17 shows a simplified block diagram of an accessory 1700 according to an embodiment of the present invention. Accessory 1700 can implement any or all of the accessory functions, behaviors, and capabilities described herein, as well as other functions, behaviors, and capabilities not expressly described. Accessory 1700 can include storage device 1728, processing subsystem 1730, user interface 1732, accessory-specific hardware 1734, communication interface 1736, secure storage module 1738, and cryptographic logic module 1740. Accessory 1700 can also include other components (not explicitly shown) such as a battery, power controllers, and other components operable to provide various enhanced capabilities.

Accessory 1700 is representative of a broad class of accessories that can be operated by a controller such as controller 1600, and such accessories can vary widely in capability, complexity, and form factor. Various accessories may include components not explicitly shown in FIG. 17, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1728 can be implemented, e.g., using disk, flash memory, or any other non-transitory storage medium, or a combination of media, and can include volatile and/or non-volatile media. In some embodiments, storage device 1728 can store one or more programs (e.g., firmware) to be executed by processing subsystem 1730, including programs to implement various operations described above as being performed by an accessory, as well as operations related to particular accessory behaviors. Storage device 1728 can also store an accessory object or accessory definition record that can be furnished to controller devices, e.g., during device discovery as described in above-referenced U.S. application Ser. No. 14/614,914. Storage device 1728 can also store accessory state information and any other data that may be used during operation of accessory 1700. Storage device 1728 can also store program code executable to communicate with a relay service, e.g., as described above.

Processing subsystem 1730 can include, e.g., one or more single-core or multi-core microprocessors and/or microcontrollers executing program code to perform various functions associated with accessory 1700. For example, processing subsystem 1730 can implement various processes (or portions thereof) described above as being implemented by an accessory, e.g., by executing program code stored in storage device 1728. Processing subsystem 1730 can also execute other programs to control other functions of accessory 1700. In some instances programs executed by processing subsystem 1730 can interact with a controller (e.g., controller 1600), e.g., by generating messages to be sent to the controller and/or receiving messages from the controller. In some instances, the messages can be sent and/or received using a relay service as described above.

User interface 1732 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1700, a user can operate input devices of user interface 1732 to invoke functionality of accessory 1700 and can view and/or hear output from accessory 1700 via output devices of user interface 1732. Some accessories may provide a minimal or no user interface. Where the accessory does not have a user interface, a user can still interact with the accessory using a controller (e.g., controller 1600).

Accessory-specific hardware 1734 can include any other components that may be present in accessory 1700 to enable its functionality. For example, in various embodiments accessory-specific hardware 1734 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1734 and that accessory-specific hardware can include mechanical as well as electrical or electronic components.

Communication interface 1736 can provide voice and/or data communication capability for accessory 1700. In some embodiments communication interface 1736 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1736 can provide wired network connectivity (e.g., Ethernet) in addition to or instead of a wireless interface. Communication interface 1736 can be implemented using a combination of hardware (e.g., driver circuits, antennas, modulators/demodulators, encoders/decoders, and other analog and/or digital signal processing circuits) and software components. In some embodiments, communication interface 1736 can support multiple communication channels concurrently or at different times, using the same transport or different transports. Thus, for example, accessory 1700 can communicate with a controller via a local channel at some times and via a relay service at other times.

Secure storage module 1738 can be an integrated circuit or the like that can securely store cryptographic information for accessory 1700. Examples of information that can be stored within secure storage module 1738 include the accessory's long-term public and secret keys 1742 (LTPKA, LTSKA), a list of local pairings 1744 (e.g., a lookup table that maps a local controller identifier to a controller long-term public key (LTPKC) for controllers that have completed a local pair setup or pair add process, e.g., as described above, with accessory 1700), and a list of relay pairings 1746 (e.g., controller RAs and associated access tokens for controllers that have established a relay pairing, e.g., as described above, with accessory 1700). In some embodiments, pairing information can be stored such that a local pairing 1744 is mapped to the corresponding relay pairing 1746 in instances where both a local pairing and a relay pairing with the controller have been established. In some embodiments, secure storage module 4038 can be omitted; keys and lists of paired controllers can be stored in storage device 1728.

In some embodiments, cryptographic operations can be implemented in a cryptographic logic module 1740 that communicates with secure storage module 1738. Physically, cryptographic logic module 1740 can be implemented in the same integrated circuit with secure storage module 1738 or a different integrated circuit (e.g., a processor in processing subsystem 1730) as desired. Cryptographic logic module 1740 can include various logic circuits (fixed or programmable as desired) that implement or support cryptographic operations of accessory 1700, including any or all cryptographic operations described above. Secure storage module 1738 and/or cryptographic logic module 1740 can appear as a "black box" to the rest of accessory 1700. Thus, for instance, communication interface 1736 can receive a message in encrypted form that it cannot decrypt and can simply deliver the message to processing subsystem 1730. Processing subsystem 1730 may also be unable to decrypt the message, but it can recognize the message as encrypted and deliver it to cryptographic logic module 1740. Cryptographic logic module 1740 can decrypt the message (e.g., using information extracted from secure storage module 1738) and determine what information to return to processing subsystem 1730. As a result, certain information can be available only within secure storage module 1738 and cryptographic logic module 1740. If secure storage module 1738 and cryptographic logic module 1740 are implemented on a single integrated circuit that executes code only from an internal secure repository, this can make extraction of the information extremely difficult, which can provide a high degree of security. Other implementations are also possible.

Accessory 1700 can be any electronic apparatus that interacts with controller 1600. In some embodiments, controller 1600 can provide remote control over operations of accessory 1700 as described above. For example controller 1600 can provide a remote user interface for accessory 1700 that can include both input and output controls (e.g., a display screen to display current status information obtained from accessory 1700 and an input control such as a touchscreen overlay to allow changes to the status information). Controller 1600 in various embodiments can control any function of accessory 1700 and can also receive data from accessory 1700, via a local channel or a relay service.

It will be appreciated that the system configurations and components described herein are illustrative and that variations and modifications are possible. It is to be understood that an implementation of controller 1600 can perform all operations described above as being performed by a controller and that an implementation of accessory 1700 can perform any or all operations described above as being performed by an accessory. A proxy, bridge, tunnel, or coordinator can combine components of controller 1600 and accessory 1700, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. A relay service as described herein can allow any number of controllers (belonging to any number of users) to communicate with any number of accessories. In some embodiments, a controller can have access to an environment model that contains information about a set of accessories within an environment where the controller is frequently present (e.g., the user's home). The environment model can be constructed, e.g., by an admin controller, as the user adds accessories. In some embodiments, the environment model can associate an accessory RA and a local accessory identifier with identifying information (e.g., manufacturer, model number, serial number, firmware version, user-friendly name, etc.) for a specific accessory that is present in the environment. The controller can use the model to present an intuitive interface to the various accessories in the environment, sparing the user the need to know anything about accessory RAs or local accessory identifiers. The interface can also be independent of whether the controller is currently present in or absent from the local environment, or whether communication with a particular accessory is via a local channel or the relay service. To facilitate operations such as adding and removing relay pairings (or local pairings), a controller may present an interface that allows the user to interact with the environment model as a whole. For example, the user can instruct the controller to add a relay pairing between another controller (or another user account) and the environment model or some portion of the environment model (e.g., accessories in a particular room defined by the model). The controller can interpret this as an instruction to add a relay pairing between the user account and each accessory represented in the environment model (or portion thereof). Accordingly, in connection with process 1000 described above, the controller can automatically generate a request to the new controller to consent to a relay pairing for each accessory RA in the environment model (or portion thereof). It should be noted that communications with relay service 300 can simply include a list of accessory RAs, and relay service 300 does not need to have access to any other information that may be included in an environment model. Nor does relay service 300 need to know whether a list of accessory RAs it receives is exhaustive of all accessories in a particular environment. In some embodiments, the environment model can be shared between controllers authorized to access it, e.g., using synchronization operations as described in above-referenced U.S. application Ser. No. 14/725,912, and a controller that obtains relay pairings via an admin controller (e.g., via process 1000 described above) can use the shared environment model to associate the accessory RAs with specific accessories in the environment.

Embodiments described above allow a relay service to operate without retaining any information as to the types and/or functionalities of the accessories that can be controlled by a particular controller. As described above, the relay service can assign a relay alias to each accessory in a manner such that the relay alias reveals no information about the accessory's identity (e.g., make, manufacturer), functionality (e.g., door lock, light bulb, refrigerator, etc.), or physical location (including a relative location within an environment such as a particular room as well as absolute geographical position). Thus, even in the event that an unauthorized party succeeds in obtaining information from relay service 300 described above, the information would be limited. For instance, it may be possible to determine from token repository 322 how many accessories a particular operator RA can control but not what any of those accessories actually do or where they might be found. Further security is provided in that controllers can be required to authenticate with relay service 300 prior to sending messages to an accessory, in that controllers can only send a message to an accessory if they have a valid access token for the accessory RA (and vice versa) and in that the controller and accessory can establish end-to-end encryption independently of relay service 300.

An accessory treated as an "endpoint accessory" from the perspective of the relay service can in some cases be a proxy capable of relaying messages to other accessories within the local environment, e.g., as described in above-referenced U.S. application Ser. No. 14/725,891. Thus, for instance, a low-power accessory does not need to maintain a connection to the accessory courier server; a proxy in the local environment with the low-power accessory can maintain the connection to the relay service and can locally connect with the low-power accessory as needed to communicate any messages received from the relay service.

As noted above, an access token can have an expiration date set when it is created. In some embodiments, the expiration date can default to a standard value (e.g., 1 week or 1 month after creation). In some embodiments, the user creating an access token (e.g., an admin user) can specify an expiration date for the token (e.g., to grant limited-time access to somebody who is house-sitting, etc.). Verifying the access token can include checking the expiration date and invalidating the token if the date has passed.

In some embodiments, various servers and operations provided by the relay service can be accessed through a common addressing scheme. For example, all communications from accessories can be sent as HTTP requests addressed to a single Internet domain name (e.g., relay-service.service-provider-name.com); the message can specify a relative URL for the appropriate server (e.g., a GET request to relative URL "/id" can be used to obtain an accessory RA, a POST request to relative URL "/connect" can be used to establish a connection to the accessory courier server, and so on).

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method performed by a new controller for enabling the new controller to control one or more accessories controlled by a first controller, comprising:
   receiving, from the first controller, a request for consent to add the new controller to control the one or more accessories;
   determining whether consent is to be granted;
   obtaining an operator relay alias;
   transmitting, to an identity service, a request for a consent token using the operator relay alias;
   receiving, from the identity service, the consent token;
   transmitting, to the first controller, a first message that includes the consent token; and
   receiving, from the first controller, a second message that includes one or more access tokens and one or more accessory relay aliases.

2. The method of claim 1, further comprising storing the one or more access tokens.

3. The method of claim 2, further comprising controlling the one or more accessories based at least in part on the one or more access tokens.

4. The method of claim 1, further comprising determining one or more accessory identifiers for each accessory relay alias of the one or more received accessory relay aliases.

5. The method of claim 4, further comprising storing the one or more accessory identifiers.

6. The method of claim 1, wherein the first controller and the new controller communicate via a controller courier service.

7. The method of claim 6, wherein the controller courier service comprises a controller-to-controller messaging service.

8. A method performed by an identity service for enabling a new controller to control one or more accessories controlled by a first controller, comprising:
   receiving, from the new controller, a request for a consent token;
   generating a consent token based at least in part on the request;
   transmitting, to the new controller, the consent token;
   receiving, from the first controller, a request to retrieve an access token for the new controller;
   generating a new access token for the new controller; and
   transmitting, to the first controller, the new access token for the new controller.

9. The method of claim 8, wherein the first controller is an administrator controller configured the new controller access to the one or more accessories.

10. The method of claim 9, wherein the request for the consent token includes an operator relay alias associated with the administrator controller.

11. The method of claim 10, wherein the consent token is generated further based at least in part on the operator relay alias.

12. The method of claim 8, wherein the request to retrieve the access token includes the consent token.

13. The method of claim 12, further comprising verifying the consent token.

14. The method of claim 8, further comprising generating an accessory relay alias for each accessory of the one or more accessories.

15. The method of claim 14, further comprising transmitting each accessory relay alias to the first controller.

16. A method performed by a first controller for enabling a new controller to control one or more accessories controlled by the first controller, comprising:
   transmitting, to the new controller, a request for consent to authorize the new controller to control the one or more accessories controlled by the first controller;
   receiving, from the new controller, a first message that includes a consent token generated by an identity service;
   transmitting, to the identity service, a request to receive an access token for the new controller;
   receiving, from the identity service, one or more new access tokens;
   transmitting, to each accessory of the one or more accessories, a respective new access token of the one or more new access tokens; and
   transmitting, to the new controller, a second message that includes the one or more new access tokens.

17. The method of claim 16, wherein the consent token is generated in response to a request from the new controller that includes an operator relay alias.

18. The method of claim 17, wherein the request from the new controller is based at least in part on a second request from the first controller.

19. The method of claim 16, wherein the request to receive the access token includes the consent token.

20. The method of claim 16, wherein second message further includes one or more respective accessory relay aliases corresponding to the one or more accessories.

* * * * *